US009923825B2

(12) United States Patent
Bernheim et al.

(10) Patent No.: US 9,923,825 B2
(45) Date of Patent: Mar. 20, 2018

(54) SYSTEM AND METHODS FOR ASSIGNING SLOTS AND RESOLVING SLOT CONFLICTS IN AN ELECTRICAL DISTRIBUTION GRID

(71) Applicants: Astrolink International LLC, Bethesda, MD (US); Dominion Energy Technologies, Inc., Richmond, VA (US)

(72) Inventors: Henrik Fernand Bernheim, Denver, CO (US); Jerritt Harold Hansell, Boulder, CO (US)

(73) Assignees: Astrolink International LLC, Bethesda, MD (US); Dominion Energy Technologies, Inc., Richmond, VA (US)

( * ) Notice: Subject to any disclaimer, the term of this patent is extended or adjusted under 35 U.S.C. 154(b) by 41 days.

(21) Appl. No.: 14/928,783

(22) Filed: Oct. 30, 2015

(65) Prior Publication Data

US 2016/0127242 A1 May 5, 2016

Related U.S. Application Data

(60) Provisional application No. 62/072,882, filed on Oct. 30, 2014.

(51) Int. Cl.
H04L 12/26 (2006.01)
H04L 12/803 (2013.01)
H04B 3/54 (2006.01)
H04L 12/801 (2013.01)
H04L 5/00 (2006.01)

(52) U.S. Cl.
CPC ............ *H04L 47/122* (2013.01); *H04B 3/54* (2013.01); *H04L 5/0053* (2013.01); *H04L 47/11* (2013.01)

(58) Field of Classification Search
CPC ..... H04L 47/122; H04L 5/0053; H04L 47/11; H04B 3/54
USPC ......................................................... 370/244
See application file for complete search history.

(56) References Cited

U.S. PATENT DOCUMENTS 4,200,770 A    4/1980  Hellman et al.
4,371,867 A    2/1983  Gander
4,668,934 A    5/1987  Shuey
(Continued)

FOREIGN PATENT DOCUMENTS

CN      101770007 A     7/2010
EP       0629098 A2    12/1994
(Continued)

OTHER PUBLICATIONS

Search Report for Japanese Patent Application No. 2011-512749, search dated Aug. 14, 2013, 29 pages.
(Continued)

*Primary Examiner* — Sai-Ming Chan
(74) *Attorney, Agent, or Firm* — Withrow & Terranova, PLLC

(57) ABSTRACT

A system and method for detecting and resolving conflicts in transmissions from DTs located on the edge of an electrical power distribution grid. By examining the frame and time slot of the conflict and inferring a possible DT involved in the transmission conflict and reassigning the DT's transmission to another frame and time slot, the conflict should be resolved and the data being provided by the DT is not necessarily lost nor is its receipt unreasonably delayed.

20 Claims, 15 Drawing Sheets

(56) References Cited

U.S. PATENT DOCUMENTS

| | | | |
|---|---|---|---|
| 4,918,422 A | 4/1990 | Mak | |
| 5,463,624 A * | 10/1995 | Hogg | H04L 12/403 |
| | | | 370/461 |
| 5,812,557 A | 9/1998 | Stewart et al. | |
| 6,212,560 B1 | 4/2001 | Fairchild | |
| 6,366,062 B2 | 4/2002 | Baretich et al. | |
| 6,373,399 B1 | 4/2002 | Johnson et al. | |
| 6,650,249 B2 | 11/2003 | Meyer et al. | |
| 6,690,655 B1 | 2/2004 | Miner et al. | |
| 6,788,702 B1 * | 9/2004 | Garcia-Luna-Aceves | H04L 45/02 |
| | | | 370/337 |
| 6,961,641 B1 | 11/2005 | Forth et al. | |
| 7,069,117 B2 | 6/2006 | Wilson et al. | |
| 7,076,378 B1 | 7/2006 | Huebner | |
| 7,188,003 B2 | 3/2007 | Ransom et al. | |
| 7,194,528 B1 | 3/2007 | Davidow | |
| 7,236,765 B2 | 6/2007 | Bonicatto et al. | |
| 7,280,931 B1 | 10/2007 | Kim et al. | |
| 7,369,579 B2 | 5/2008 | Logvinov et al. | |
| 7,571,028 B2 | 8/2009 | Lapinski et al. | |
| 7,701,330 B2 | 4/2010 | Iwamura | |
| 7,808,128 B1 | 10/2010 | Weber, Jr. et al. | |
| 7,870,600 B2 | 1/2011 | Huotari et al. | |
| 7,873,077 B2 | 1/2011 | Downey et al. | |
| 7,948,255 B2 | 5/2011 | Shim et al. | |
| 8,207,726 B2 | 6/2012 | Vaswani et al. | |
| 8,519,832 B2 | 8/2013 | Loporto et al. | |
| 8,639,922 B2 | 1/2014 | Phatak | |
| 8,639,992 B2 | 1/2014 | Haufe et al. | |
| 8,711,995 B2 | 4/2014 | Glende | |
| 8,737,555 B2 | 5/2014 | Haug et al. | |
| 8,818,742 B2 | 8/2014 | Ansari | |
| 8,872,667 B2 | 10/2014 | Bhageria et al. | |
| 9,059,842 B2 | 6/2015 | Bernheim et al. | |
| 9,287,933 B2 | 3/2016 | Yu | |
| 2001/0018561 A1 | 8/2001 | Tanida | |
| 2001/0037378 A1 | 11/2001 | Hirayama | |
| 2002/0069299 A1 | 6/2002 | Rosener et al. | |
| 2002/0089927 A1 | 7/2002 | Fischer et al. | |
| 2003/0098671 A1 | 5/2003 | Hochgraf | |
| 2004/0062267 A1 | 4/2004 | Minami et al. | |
| 2004/0110044 A1 | 6/2004 | McArthur et al. | |
| 2004/0226621 A1 | 11/2004 | Phillips et al. | |
| 2004/0227621 A1 | 11/2004 | Cope et al. | |
| 2005/0005150 A1 | 1/2005 | Ballard | |
| 2005/0017848 A1 | 1/2005 | Flen et al. | |
| 2005/0043860 A1 | 2/2005 | Petite | |
| 2005/0144437 A1 | 6/2005 | Ransom et al. | |
| 2005/0207079 A1 | 9/2005 | Tiller et al. | |
| 2006/0071757 A1 * | 4/2006 | Burghard | G06K 7/0008 |
| | | | 340/10.2 |
| 2006/0091877 A1 | 5/2006 | Robinson et al. | |
| 2006/0152344 A1 | 7/2006 | Mowery, Jr. | |
| 2006/0291575 A1 | 12/2006 | Berkman et al. | |
| 2007/0076650 A1 * | 4/2007 | Manjeshwar | H04W 24/02 |
| | | | 370/328 |
| 2007/0100506 A1 | 5/2007 | Teichmann | |
| 2007/0101438 A1 | 5/2007 | Govindarajan | |
| 2007/0114987 A1 | 5/2007 | Kagan | |
| 2007/0162550 A1 | 7/2007 | Rosenberg | |
| 2007/0208521 A1 | 9/2007 | Petite et al. | |
| 2007/0211401 A1 | 9/2007 | Mak | |
| 2007/0237181 A1 | 10/2007 | Cho et al. | |
| 2007/0271383 A1 | 11/2007 | Kim et al. | |
| 2007/0297425 A1 | 12/2007 | Chirco | |
| 2008/0040479 A1 | 2/2008 | Bridge et al. | |
| 2008/0109387 A1 | 5/2008 | Deaver et al. | |
| 2008/0209481 A1 | 8/2008 | Barrett | |
| 2008/0273521 A1 | 11/2008 | Shao et al. | |
| 2008/0312851 A1 | 12/2008 | Kagan et al. | |
| 2009/0027061 A1 | 1/2009 | Curt et al. | |
| 2009/0088907 A1 | 4/2009 | Lewis et al. | |
| 2009/0096416 A1 | 4/2009 | Tonewaga et al. | |
| 2009/0134699 A1 | 5/2009 | Choi et al. | |
| 2009/0210197 A1 | 8/2009 | Cleary | |
| 2009/0219932 A1 | 9/2009 | Kobayashi | |
| 2009/0240504 A1 | 9/2009 | Pang et al. | |
| 2009/0256686 A1 | 10/2009 | Abbot et al. | |
| 2010/0005273 A1 | 1/2010 | Lee et al. | |
| 2010/0007219 A1 | 1/2010 | de Buda et al. | |
| 2010/0007336 A1 | 1/2010 | de Buda | |
| 2010/0010857 A1 | 1/2010 | Fadell | |
| 2010/0054349 A1 | 3/2010 | Spencer | |
| 2010/0134089 A1 | 6/2010 | Uram et al. | |
| 2010/0141392 A1 | 6/2010 | Jo et al. | |
| 2010/0188260 A1 | 7/2010 | Cornwall et al. | |
| 2010/0217549 A1 | 8/2010 | Galvin et al. | |
| 2010/0217550 A1 | 8/2010 | Crabtree et al. | |
| 2010/0262313 A1 | 10/2010 | Chambers et al. | |
| 2010/0262393 A1 | 10/2010 | Sharma et al. | |
| 2010/0286840 A1 | 11/2010 | Powell et al. | |
| 2010/0296560 A1 | 11/2010 | Sadan et al. | |
| 2011/0035073 A1 | 2/2011 | Ozog | |
| 2011/0040803 A1 * | 2/2011 | Pasquero | G06Q 10/109 |
| | | | 707/803 |
| 2011/0043340 A1 | 2/2011 | Kim et al. | |
| 2011/0103429 A1 | 5/2011 | Tanaka et al. | |
| 2011/0109320 A1 | 5/2011 | Curt et al. | |
| 2011/0121654 A1 | 5/2011 | Recker et al. | |
| 2011/0122798 A1 | 5/2011 | Hughes et al. | |
| 2011/0130992 A1 | 6/2011 | Kolwalkar et al. | |
| 2011/0133655 A1 | 6/2011 | Recker et al. | |
| 2011/0140911 A1 | 6/2011 | Pant et al. | |
| 2011/0196546 A1 | 8/2011 | Muller et al. | |
| 2011/0216747 A1 | 9/2011 | Shao et al. | |
| 2011/0224935 A1 | 9/2011 | Hampel et al. | |
| 2011/0267202 A1 | 11/2011 | Efthymiou et al. | |
| 2011/0282508 A1 | 11/2011 | Goutard et al. | |
| 2011/0285382 A1 | 11/2011 | Kolwalkar et al. | |
| 2012/0036250 A1 | 2/2012 | Vaswani et al. | |
| 2012/0041696 A1 | 2/2012 | Sanderford, Jr. et al. | |
| 2012/0052870 A1 | 3/2012 | Habicher | |
| 2012/0062210 A1 | 3/2012 | Veillette | |
| 2012/0062390 A1 | 3/2012 | Solomon | |
| 2012/0068784 A1 | 3/2012 | Varadarajan et al. | |
| 2012/0075099 A1 | 3/2012 | Brown | |
| 2012/0139554 A1 | 6/2012 | Parsons | |
| 2012/0155557 A1 | 6/2012 | Bush et al. | |
| 2012/0158329 A1 | 6/2012 | Hurri et al. | |
| 2012/0185838 A1 | 7/2012 | Schwartzman et al. | |
| 2012/0195355 A1 | 8/2012 | El-Essawy et al. | |
| 2012/0201145 A1 | 8/2012 | Ree et al. | |
| 2012/0201155 A1 | 8/2012 | Du et al. | |
| 2012/0232915 A1 | 9/2012 | Bromberger | |
| 2012/0242499 A1 | 9/2012 | Ree | |
| 2012/0245869 A1 | 9/2012 | Ansari | |
| 2012/0262355 A1 | 10/2012 | He et al. | |
| 2012/0265355 A1 | 10/2012 | Bernheim et al. | |
| 2012/0275526 A1 | 11/2012 | Hughes | |
| 2012/0310424 A1 | 12/2012 | Taft | |
| 2012/0310558 A1 | 12/2012 | Taft | |
| 2012/0313620 A1 | 12/2012 | Swarztrauber et al. | |
| 2012/0314782 A1 | 12/2012 | Boivin et al. | |
| 2012/0316696 A1 | 12/2012 | Boardman et al. | |
| 2012/0323388 A1 | 12/2012 | Littrell et al. | |
| 2013/0013232 A1 | 1/2013 | Parwal et al. | |
| 2013/0031201 A1 | 1/2013 | Kagan et al. | |
| 2013/0034086 A1 | 2/2013 | Martin et al. | |
| 2013/0132555 A1 | 5/2013 | Wang et al. | |
| 2013/0151177 A1 | 6/2013 | Hughes | |
| 2013/0193767 A1 | 8/2013 | Carralero et al. | |
| 2013/0204450 A1 | 8/2013 | Kagan et al. | |
| 2014/0035372 A1 | 2/2014 | Normoyle et al. | |
| 2014/0062719 A1 | 3/2014 | Rowitch | |
| 2014/0118163 A1 | 5/2014 | Li et al. | |
| 2014/0140358 A1 | 5/2014 | Kim et al. | |
| 2014/0172723 A1 | 6/2014 | Borisov et al. | |
| 2014/0191568 A1 | 7/2014 | Partovi | |
| 2014/0233620 A1 | 8/2014 | Bernheim et al. | |
| 2014/0233662 A1 | 8/2014 | Hansell et al. | |
| 2014/0236365 A1 | 8/2014 | Martin et al. | |
| 2014/0236366 A1 | 8/2014 | Livadaras et al. | |
| 2014/0236506 A1 | 8/2014 | Nikovski et al. | |
| 2014/0300210 A1 | 10/2014 | Abi-Ackel et al. | |

(56) References Cited

U.S. PATENT DOCUMENTS

| | | |
|---|---|---|
| 2014/0359595 A1 | 12/2014 | Sehgal et al. |
| 2014/0361907 A1 | 12/2014 | Bernheim et al. |
| 2014/0368189 A1 | 12/2014 | Bernheim et al. |
| 2015/0010093 A1 | 1/2015 | Hansell et al. |
| 2015/0316620 A1 | 11/2015 | Luan et al. |
| 2016/0112378 A1 | 4/2016 | Bernheim et al. |
| 2016/0124421 A1 | 5/2016 | Hansell et al. |
| 2016/0164287 A1 | 6/2016 | Bernheim |
| 2016/0204991 A1 | 7/2016 | Martin et al. |
| 2016/0285511 A1 | 9/2016 | Hansell et al. |
| 2016/0302238 A1 | 10/2016 | Martin et al. |

FOREIGN PATENT DOCUMENTS

| | | |
|---|---|---|
| EP | 1901145 A2 | 3/2008 |
| EP | 2330430 A1 | 6/2011 |
| EP | 2566125 A1 | 3/2013 |
| JP | 2003259696 A | 9/2003 |
| JP | 2003339120 A | 11/2003 |
| JP | 2004147063 A | 5/2004 |
| JP | 2005252671 | 9/2005 |
| JP | 2006262570 A | 9/2006 |
| JP | 2007185083 A | 7/2007 |
| JP | 2008508781 A1 | 3/2008 |
| JP | 2008098812 A | 4/2008 |
| JP | 2008124859 A | 5/2008 |
| JP | 2013005718 A1 | 1/2013 |
| WO | 2009067250 A1 | 5/2009 |
| WO | 2010027421 A2 | 3/2010 |
| WO | 2010141859 A1 | 12/2010 |
| WO | 2013013162 A2 | 1/2013 |
| WO | 2014006662 A1 | 1/2014 |

OTHER PUBLICATIONS

Office Action for Japanese Patent Application No. 2011-512749, drafting dated Sep. 4, 2013, 7 pages.

Author Unknown, "MicroPianet® Voltage Regulators," Energyldeas Clearinghouse PTR #6.4, Product and Technology Review, Jun. 2008, 6 pages, http://www.energyideas.org/documents/factsheets/PTR/Microplanet.pdf.

Author Unknown, "Prime Alliance Official Website," Web, Date Accessed: Nov. 4, 2015, 3 pages, http://www.prime-alliance.org/.

Author Unknown, "The G3 PLC Alliance Unveils its Interoperability process," The G3-PLC Alliance, Oct. 8, 2012, Paris, France, http://www.g3-plc.com/content/press-releases, p. 1.

Author Unknown, "TWACS Low Frequency Power Line Communication Signals Problematic to Public Health," dated May 3, 2013, 20 pages, http://www.eiwellspring.org/smartmeter/TWACS.pdf.

Author Unknown, "Universal Powerline Bus Communication Technology Overview," Powerline Control Services, Jan. 8, 2002, 13 pages, http://pulseworx.com/downloads/upb/UpbOverview.pdf.

Baggini, Angelo "Handbook of Power Quality" John Wiley & Sons, Ltd., 2008, 65 pages.

Bates, Michael, "CVR has Potential Beyond Pushing Efficiencies on Feeders." renewGRID, Mar. 26, 2012, 2 pages, http://www.renew-grid.com/e107plugins/contenl/contenl.php?contenl.8215.

Bresesti, Paola et al., "SDNO: Smart Distribution Network Operation Project", Power Engineering Society General Meeting, IEEE, 2007, 4 pages.

Choi, Moonsuk et al., "Design of Integrated Meter Reading System based on Power-Line Communication", Power Line Communications and Its Applications, IEEE, International Symposium, 2008, pp. 280-284.

Collins, Dermot et al., "Transmission on Power Line Cables," Telektronikk, vol. 95, No. 2/3, 1999, pp. 134-137.

Dilek, M., "Integrated Design of Electrical Distribution Systems: Phase Balancing and Phase Prediction Case Studies," Dissertation, 2001, 150 pages, http://scholar.lib.vt.edu/theses/available/etd-11132001-222401/.

Goh, Chong Hock K., "A Current Study of Automatic Meter Reading Solutions via Power Line Communications," 19 pages, http://wpweb2k.gsia.cmu.edu/ceic/publicatons.htm (Published 2003 or later as evidenced by the bibliography).

Ha, K. A., "Power Line Communication Technology," Presentation at Hong Kong Institute of Engineers Seminar on Last Mile Technology, Jun. 20, 2003, 24 pages.

Hooijen, Olaf G. "A Channel Model for the Residential Power Circuit Used as a Digital Communications Medium," IEEE Transactions on Electromagnetic Compatibility, vol. 40, No. 4, Nov. 1998, pp. 331-336.

McGhee, Jim et al., "Smart High Voltage Substation based on IEC 61850 Process Bus and IEEE 1588 Time Synchronization" 2010 First IEEE International Conference on Smart Grid Communications, IEEE, Oct. 4-6, 2010, pp. 489-494.

Mitchell, Travis, "Dominion Conservation Voltage Reduction software reduces energy use by 2.8%," Fierce Energy Daily, Sep. 27, 2011, 3 pages, http://www.fierceenergy.com/story/dominion-conservation-voltage-reduction-soflware-reduces-energy-use-28/2011-09-27.

Montoya, Luis F.,"Power Line Communications Performance Overview of the Physical Layer of Available Protocols," Thesis of Research, University of Florida, Gainesville, Florida, Date Unknown, pp. 1-15.

Moreno-Munoz A., et al., "Integrating Power Quality to Automated Meter Reading", IEEE Industrial Electronics Magazine, IEEE, US, vol. 2, No. 2, Jun. 17, 2008, pp. 10-18.

Newbury, John, "Efficient Communication Services Using the Low Voltage Distribution Line," Proceedings of 2002 PES Winter Meeting, IEEE, 2002, pp. 579-591.

Nyack Cuthbert A., "Convolution and Autocorrelation," Web, Date Accessed: Nov. 4, 2015, 3 pages, http://cnyack.homestead.com/files/aconv/convau1.htm.

Pallares-Lopez et al., "Embedding synchronism in SmartGrid with IEEE1588-based for Intelligent Electronics," 2010 First IEEE International Conference on Smart Grid Communications, published/presented Oct. 4-6, 2010, Gaithersburg, Maryland, 7 pages.

Pavlidou, Niovi et al., "Power Line Communications: State of the Art and Future Trends," IEEE Communications Magazine, IEEE, vol. 41, No. 4, Apr. 2003, pp. 34-40.

Rye, Dave, "The X-10 POWERHOUSE Power Line Interface Model #PL513 and Two-Way Power Line Interface Model #TW523," X-10 Inc., X-10.RTM. POWERHOUSE (TM) Technical Note, Revision 2A, 1991, 12 pages.

Schickhuber, Gerald et al., "Control Using Power Lines—A European View," Computing & Control Engineering Journal, vol. 8, No. 4, Aug. 1997, pp. 180-184.

Sherman et al, "Location Authentication through Power Line Communication: Design, Protocol, and Analysis of a New Out of Band Strategy," Cyber Defense Lab, Department of CSEE, University of Maryland, Baltimore County, IEEE, 2010, pp. 279-284.

Van Rensburg, Petrus A. Hanse et al., "Design of a Bidirectional Impedance-Adapting Transformer Coupling Circuit for Low-Voltage Power-Line Communications," IEEE Transactions on Power Delivery, IEEE, vol. 20, No. 1, Jan. 2005, pp. 64-70.

International Search Report for PCT/US2014/016538, dated Jun. 16, 2014, 3 pages.

International Preliminary Report on Patentability for PCT/US2014/016538, dated Sep. 3, 2015, 10 pages.

International Search Report for PCT/US2014/016540, dated Jun. 17, 2014, 3 pages.

International Preliminary Report on Patentability for PCT/US2014/016540, dated Sep. 3, 2015, 9 pages.

International Search Report for PCT/US2014/016535, dated Jun. 3, 2014, 2 pages.

International Preliminary Report on Patentability for PCT/US2014/016535, dated Sep. 3, 2015, 8 pages.

International Search Report and Written Opinion for PCT/US2014/041396, dated Oct. 29, 2014, 12 pages.

International Search Report and Written Opinion for PCT/US2014/042300, dated Oct. 20, 2014, 16 pages.

International Search Report and Written Opinion for PCT/US2014/042393, dated Oct. 20, 2014, 15 pages.

(56) References Cited

OTHER PUBLICATIONS

International Search Report for PCT/US2009/046644, dated Mar. 2, 2010, 7 pages.
International Preliminary Report on Patentability for PCT/US2009/046644, dated Dec. 6, 2010, 10 pages.
International Search Report for PCT/US2012/033789, dated Sep. 6, 2012, 4 pages.
International Search Report for PCT/US2012/041971, dated Dec. 7, 2012, 5 pages.
International Search Report for PCT/US2012/049524, dated Jan. 3, 2013, 3 pages.
Non-Final Office Action for U.S. Appl. No. 13/566,481, dated Aug. 7, 2015, 27 pages.
Non-Final Office Action for U.S. Appl. No. 13/493,983, dated Feb. 5, 2014, 11 pages.
Final Office Action for U.S. Appl. No. 13/493,983, dated Oct. 31, 2014, 12 pages.
Non-Final Office Action for U.S. Appl. No. 13/448,005, dated Sep. 11, 2014, 20 pages.
Non-Final Office Action for U.S. Appl. No. 13/448,005, dated Apr. 15, 2015, 22 pages.
Non-Final Office Action for U.S. Appl. No. 12/480,493, dated Jul. 16, 2012, 24 pages.
Notice of Allowance and Examiner-Initiated Interview Summary for U.S. Appl. No. 12/480,493, dated Jun. 20, 2013, 13 pages.
Non-Final Office Action for U.S. Appl. No. 13/896,029, dated Sep. 18, 2015, 16 pages.
Non-Final Office Action for U.S. Appl. No. 13/871,944, dated Oct. 16, 2015, 13 pages.
Non-Final Office Action for U.S. Appl. No. 13/888,102, dated Jul. 9, 2015, 18 pages.
International Preliminary Report on Patentability for PCT/US2014/041396, dated Dec. 17, 2015, 8 pages.
International Preliminary Report on Patentability for PCT/US2014/042300, dated Dec. 23, 2015, 9 pages.
International Preliminary Report on Patentability for PCT/US2014/042393, dated Dec. 23, 2015, 11 pages.
Office Action for Canadian Patent Application No. 2,727,034, dated Nov. 26, 2015, 4 pages.
Decision of Final Rejection for Japanese Patent Application No. 2014-119504, dated Nov. 10, 2015, 5 pages.
Translation of Decision to Grant for Japanese Patent Application No. 2014-119505, dated Dec. 15, 2015, 3 pages.
Office Action for Cuban Patent Application No. 2015-0088, dated Oct. 30, 2015, 3 pages.
Final Office Action for U.S. Appl. No. 13/888,102, dated Dec. 24, 2015, 18 pages.
Non-Final Office Action for U.S. Appl. No. 13/911,849, dated Nov. 24, 2015, 15 pages.
Sendin, Alberto, et al., "Enhanced Operation of Electricity Distribution Grids Through Smart Metering PLC Network Monitoring, Analysis and Grid Conditioning," Energies, vol. 6, Issue 1, Jan. 21, 2013, www.mdpi.com/journal/energies, pp. 539-556.
Vvetula, Andrzej, "A Hilbert Transform Based Algorithm for Detection of a Complex Envelope of a Power Grid Signals—an Implementation," Journal of Electrical Power Quality and Utilisation, vol. 14, Issue 2, 2008, EPQU Journal, pp. 13-18.
Partial Supplementary European Search Report for European Patent Application No. 14754343.3, dated Feb. 8, 2016, 5 pages.
Notice of Allowance and Examiner Initiated Interview Summary for U.S. Appl. No. 13/911,849, dated Apr. 5, 2016, 10 pages.
Non-Final Office Action for U.S. Appl. No. 14/304,035, dated Feb. 25, 2016, 22 pages.
Non-Final Office Action for U.S. Appl. No. 14/720,780, dated Feb. 26, 2016, 7 pages.
Notice of Allowance for U.S. Appl. No. 13/566,481, dated Feb. 26, 2016, 7 pages.
International Search Report and Written Opinion for International Patent Application No. PCT/US2015/058423, dated Jan. 19, 2016, 12 pages.
International Search Report and Written Opinion for International Patent Application No. PCT/US2015/058492, dated Feb. 26, 2016, 18 pages.
International Search Report and Written Opinion for International Patent Application No. PCT/US2015/063752, dated Mar. 24, 2016, 16 pages.
Colson, C.M., "Algorithms for Distributed Decision-Making for Multi-agent Microgrid Power Management," IEEE Power and Energy Society General Meeting, Jul. 24-29, 2011, San Diego, California, IEEE, pp. 1-8.
Extended European Search Report for European Patent Application No. 14754343.3, dated May 24, 2016, 12 pages.
Examination Report for European Patent Application No. 09759619.1, dated May 13, 2016, 7 pages.
International Preliminary Report on Patentability for International Patent Application No. PCT/US2012/033789, dated Oct. 24, 2013, 10 pages.
International Preliminary Report on Patentability for PCT/US2012/041971, dated Dec. 10, 2013, 6 pages.
International Preliminary Report on Patentability for PCT/US2012/049524, dated Feb. 4, 2014, 7 pages.
Final Office Action for U.S. Appl. No. 13/896,029, dated Jun. 22, 2016, 22 pages.
Final Office Action for U.S. Appl. No. 13/871,944, dated Jun. 21, 2016, 22 pages.
Corrected Notice of Allowance for U.S. Appl. No. 13/911,849, dated May 31, 2016, 4 pages.
Final Office Action for U.S. Appl. No. 13/448,005, dated Jun. 6, 2016, 11 pages.
Extended European Search Report for European Patent Application No. 14754339.1, dated Jan. 16, 2017, 10 pages.
Office Action No. 13556 for Colombian Patent Application No. 15-222367, dated Nov. 28, 2016, 13 pages.
Examination Report No. 1 for Australian Patent Application No. 2014219244, dated Dec. 21, 2016, 4 pages.
Extended European Search Report for European Patent Application No. 14754714.5, dated Jan. 16, 2017, 10 pages.
Extended European Search Report for European Patent Application No. 14808081.5, dated Jan. 30, 2017, 7 pages.
Extended European Search Report for European Patent Application No. 14810273.4, dated Feb. 1, 2017, 12 pages.
Extended European Search Report for European Patent Application No. 14811042.2, dated Jan. 2, 2017, 7 pages.
Examination Report No. 1 for Australian Patent Application No. 2014219246, dated Dec. 22, 2016, 3 pages.
Advisory Action for U.S. Appl. No. 14/304,035, dated Nov. 30, 2016, 3 pages.
Partial Supplementary European Search Report for European Patent Application No. 14754339.1, dated Oct. 4, 2016, 6 pages.
Partial Supplementary European Search Report for European Patent Application No. 14754714.5, dated Oct. 5, 2016, 6 pages.
Non-Final Office Action for U.S. Appl. No. 13/896,029, dated Nov. 10, 2016, 18 pages.
Notice of Allowance for U.S. Appl. No. 13/871,944, dated Oct. 4, 2016, 9 pages.
Final Office Action for U.S. Appl. No. 14/304,035, dated Aug. 26, 2016, 18 pages.
Non-Final Office Action for U.S. Appl. No. 14/304,648, dated Sep. 7, 2016, 4 pages.
Final Office Action for U.S. Appl. No. 14/720,780, dated Sep. 1, 2016, 9 pages.
Notice of Allowance for U.S. Appl. No. 14/720,780, dated Nov. 4, 2016, 5 pages.
First Office Action for Chilean Patent Application No. 2325-2015, dated Jan. 26, 2017, 13 pages.
First Office Action for Chilean Patent Application No. 2323-2015, dated Jan. 26, 2017, 15 pages.
Office Action No. 11851, Colombian Patent Application No. 15-222367, dated Mar. 17, 2017, 19 pages.
First Office Action for Chilean Patent Application No. 2322-2015, dated Jan. 26, 2017, 15 pages.
First Office Action for Chinese Patent Application No. 201480032631.X, dated Feb. 27, 2017, 5 pages.

(56) References Cited

OTHER PUBLICATIONS

First Office Action for Chinese Patent Application No. 201480034010.5, dated Feb. 17, 2017, 7 pages.
Non-Final Office Action for U.S. Appl. No. 15/177,930, dated Mar. 3, 2017, 6 pages.
Final Office Action for U.S. Appl. No. 14/304,648, dated Mar. 9, 2017, 7 pages.
Non-Final Office Action for U.S. Appl. No. 15/184,642, dated Mar. 9, 2017, 5 pages.
Yan, Ping et al., "Study of Linear Models in Steady State Load Flow Analysis of Power Systems," IEEE Power Engineering Society Winter Meeting, vol. 1, Jan. 27-31, 2002, New York, NY, IEEE, pp. 666-671.
Translated Summary of Office Action No. 4963 for Columbian Patent Application No. 15-222371, dated Apr. 5, 2017, 3 pages.
International Preliminary Report on Patentability for International Patent Application No. PCT/US2015/058423, dated May 11, 2017, 8 pages.
International Preliminary Report on Patentability for International Patent Application No. PCT/US2015/058492, dated May 11, 2017, 10 pages.
Non-Final Office Action for U.S. Appl. No. 14/304,035, dated May 17, 2017, 22 pages.
Final Office Action for U.S. Appl. No. 14/304,648, dated May 19, 2017, 7 pages.
Advisory Action for U.S. Appl. No. 14/304,648, dated May 24, 2017, 3 pages.
Non-Final Office Action for U.S. Appl. No. 13/871,944, dated Jun. 15, 2017, 14 pages.
First Office Action for Chinese Patent Application No. 201480009551.2, dated Jun. 19, 2017, 9 pages.
Extended European Search Report for European Patent Application No. 17173049.2, dated Aug. 11, 2017, 8 pages.
Examination report No. 1 for Australian Patent Application No. 2014277983, dated Jun. 16, 2017, 4 pages.
Non-Final Office Action for U.S. Appl. No. 13/896,029, dated Jul. 20, 2017, 17 pages.
Advisory Action for U.S. Appl. No. 14/304,648, dated Aug. 17, 2017, 3 pages.
Notice of Allowance for U.S. Appl. No. 15/184,642, dated Jul. 13, 2017, 8 pages.
Notice of Allowance for U.S. Appl. No. 15/184,642, dated Jul. 27, 2017, 4 pages.
Notice of Allowance for U.S. Appl. No. 14/929,087, dated Aug. 15, 2017, 9 pages.
Second Office Action for Chinese Patent Application No. 201480032631.X, dated Sep. 4, 2017, 5 pages.
Second Office Action for Chinese Patent Application No. 201480034010.5, dated Aug. 2, 2017, 5 pages.
Final Office Action for U.S. Appl. No. 14/304,035, dated Oct. 5, 2017, 16 pages.
Examination Report No. 1 for Australian Patent Application No. 2014219247, dated Apr. 26, 2017, 4 pages.
Second Office Action for Chilean Patent Application No. 2323-2015, dated May 17, 2017, 14 pages.
Second Office Action for Chilean Patent Application No. 2322-2015, dated May 17, 2017, 13 pages.
First Office Action for Chinese Patent Application No. 201480009549.5, dated May 31, 2017, 9 pages.
Examination Report No. 1 for Australian Patent Application No. 2014277951, dated Jun. 8, 2017, 4 pages.
Office Action Summary for Columbian Patent Application No. 7058, dated Jun. 16, 2017, 2 pages.
International Preliminary Report on Patentability for International Patent Application No. PCT/US2015/063752, dated Jun. 15, 2017, 12 pages.
Office Action for Colombian Patent Application No. 15222371, dated Oct. 15, 2017, 9 pages.
First Office Action for Chinese Patent Application No. 201480034011.X, dated Oct. 30, 2017, 16 pages.
Notice of Acceptance for Australian Patent Application No. 2014219246, dated Dec. 5, 2017, 3 pages.
Office Action for Mexican Patent Application No. MX/a/2015/017231, dated Oct. 20, 2017, 13 pages.
Non-Final Office Action for U.S. Appl. No. 15/177,930, dated Nov. 1, 2017, 14 pages.
Advisory Action for U.S. Appl. No. 14/304,035, dated Dec. 29, 2017, 3 pages.
First Office Action for Chinese Patent Application No. 201480009550.8, dated Jan. 26, 2018, 4 pages.
Notice of Reasons for Rejection for Japanese Patent Application No. 2015-558889, dated Jan. 23, 2018, 7 pages.
Second Office Action for Chinese Patent Application No. 201480009549.5, dated Jan. 23, 2018, 4 pages.
Notice of Reasons for Rejection for Japanese Patent Application No. 2015-558887, dated Jan. 23, 2018, 7 pages.
Third Office Action for Chinese Patent Application No. 201480034010.5, dated Jan. 17, 2018, 4 pages.
First Examination Report for Indian Patent Application No. 13/CHENP/2011, dated Jan. 11, 2018, 6 pages.
Office Action for Canadian Patent Application No. 2,870,452, dated Dec. 28, 2017, 4 pages.
Decision to Grant a Patent for Japanese Patent Application No. 2015-558888, dated Jan. 30, 2018, 4 pages.
Final Office Action for U.S. Appl. No. 13/896,029, dated Jan. 24, 2018, 22 pages.
Non-Final Office Action for U.S. Appl. No. 14/958,385, dated Jan. 12, 2018, 33 pages.

\* cited by examiner

SYSTEM AND METHODS FOR ASSIGNING SLOTS AND RESOLVING SLOT CONFLICTS IN AN ELECTRICAL DISTRIBUTION GRID

CROSS REFERENCE TO RELATED APPLICATIONS

This application claims the benefit of U.S. provisional patent application No. 62/072,882, filed Oct. 30, 2014, the disclosure of which is incorporated herein by reference in its entirety.

FIELD OF THE INVENTION

The present invention relates to data communication systems, methods and apparatus and more particularly to data communication systems methods and apparatus associated with electrical power distribution networks.

SUMMARY

The present invention provides a system and method for detecting and resolving conflicts in transmissions between, for example, downstream transmitters (hereinafter "DT" or "DTs") located on the edge of an electrical power distribution grid and devices located at an associated substation. By examining the frame and time slot of the conflict and inferring a possible DT involved in the transmission conflict and reassigning the DT's transmission to another frame and time slot, the conflict should be resolved and the data being provided by the DT is not necessarily lost nor is its receipt unreasonably delayed. Moreover, if the DT has a plurality of scheduled transmissions during a period, then the slot assignments for each of the transmissions is rescheduled. In an aspect, the identification of a possible conflicting DT may be an iterative process whereby if a conflict appears to exist after a DT has already been reassigned slot assignment(s), then another DT may need to have its slot assignment reassigned. The invention determines the conflict without regard to having a priori knowledge of the system topology and layout, or its electrical characteristics.

The present invention provides a system and method for detecting and resolving transmissions by knowing to look for a signal to be received during a time slot. If, during that time slot, energy is detected within the communications passband and that is greater than noise on the system (i.e., candidate signal energy) and the length of the candidate signal energy is approximately the same length as a transmitted signal, then the system checks to see if a transmission header, e.g., a GLA signal, is present. If a GLA signal is present, then the signal is processed normally. If a GLA signal is not present, then the system checks which DT should be sending a transmission during that time slot, and reassigns that DT to another available time slot.

BRIEF DESCRIPTION OF THE DRAWINGS

The accompanying drawings, which are incorporated in and form part of the specification, illustrate embodiments of the invention and, together with the description, serve to explain the principles of the invention.

For purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the substance disclosed.

Figure 1:
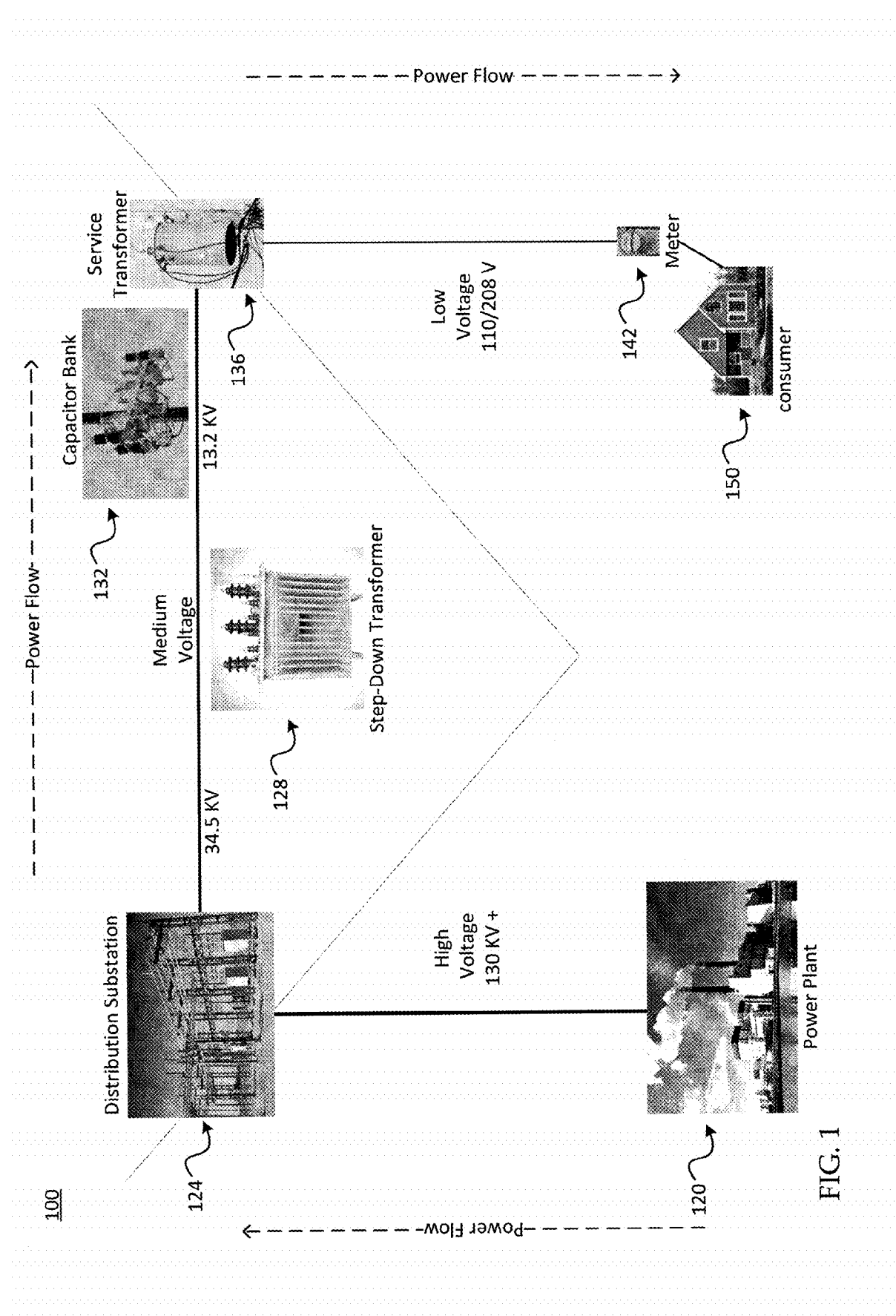

It should be noted that, while the various figures show respective aspects of the invention, no one figure is intended to show the entire invention. Rather, the figures together illustrate the invention in its various aspects and principles. As such, it should not be presumed that any particular figure is exclusively related to a discrete aspect or species of the invention. To the contrary, one of skill in the art would appreciate that the figures taken together reflect various embodiments exemplifying the invention.

Figure 2:
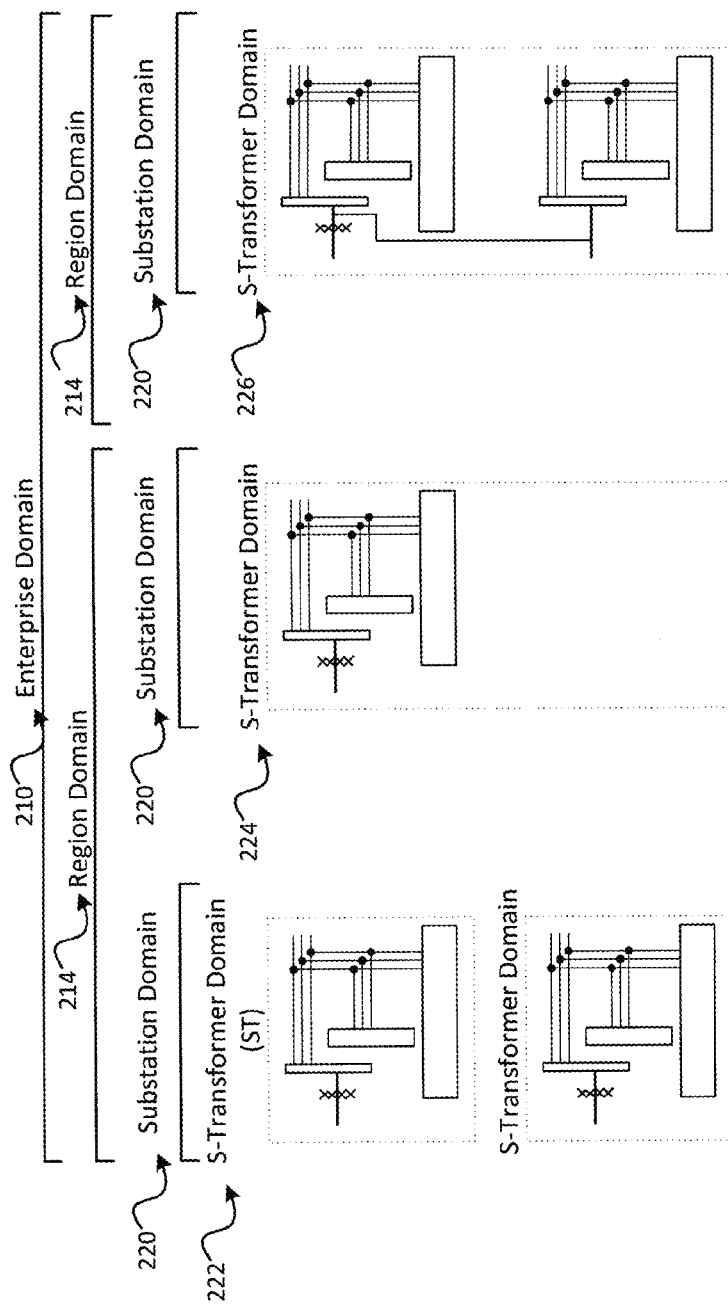
Figure 3:
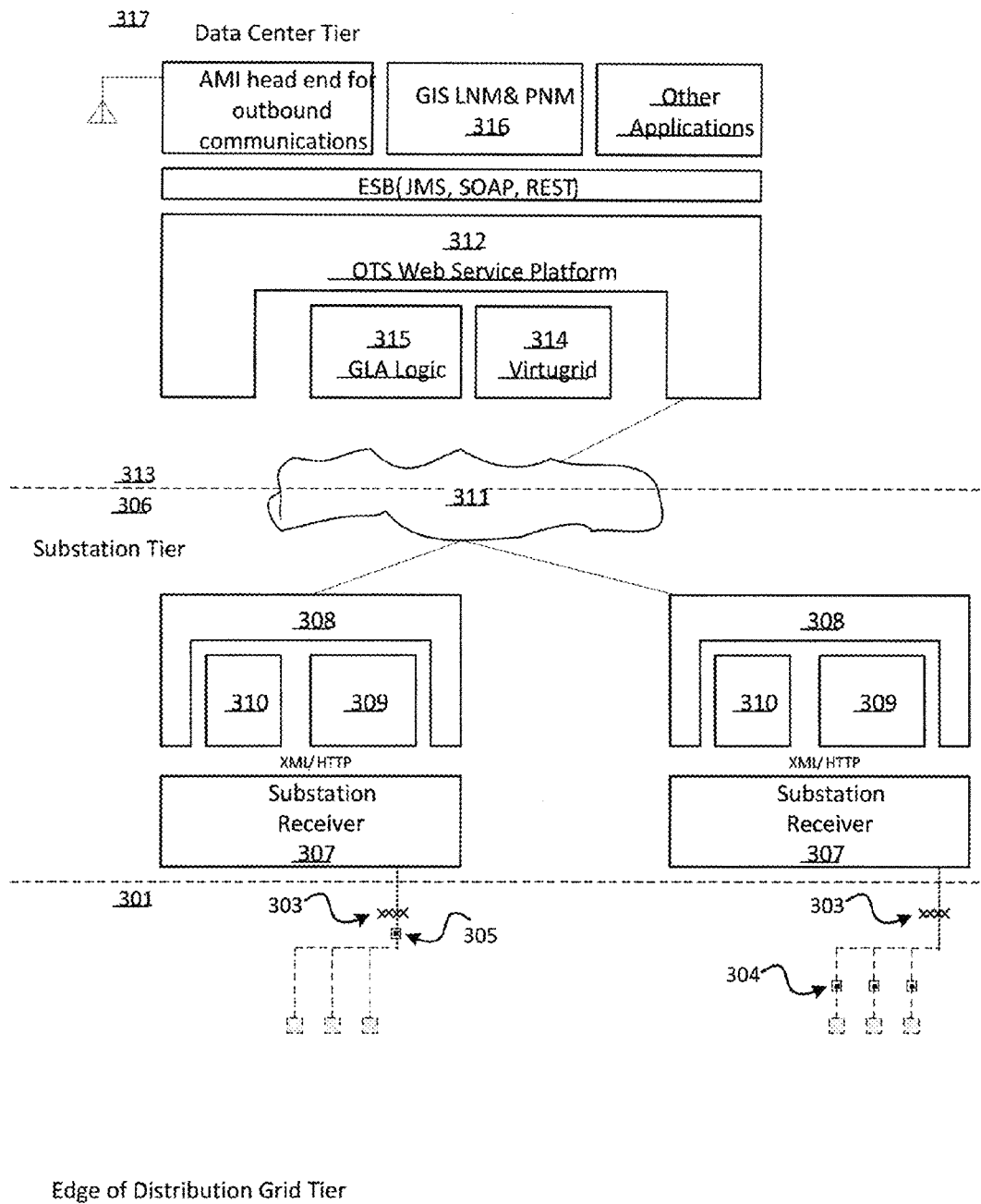
Figure 4:
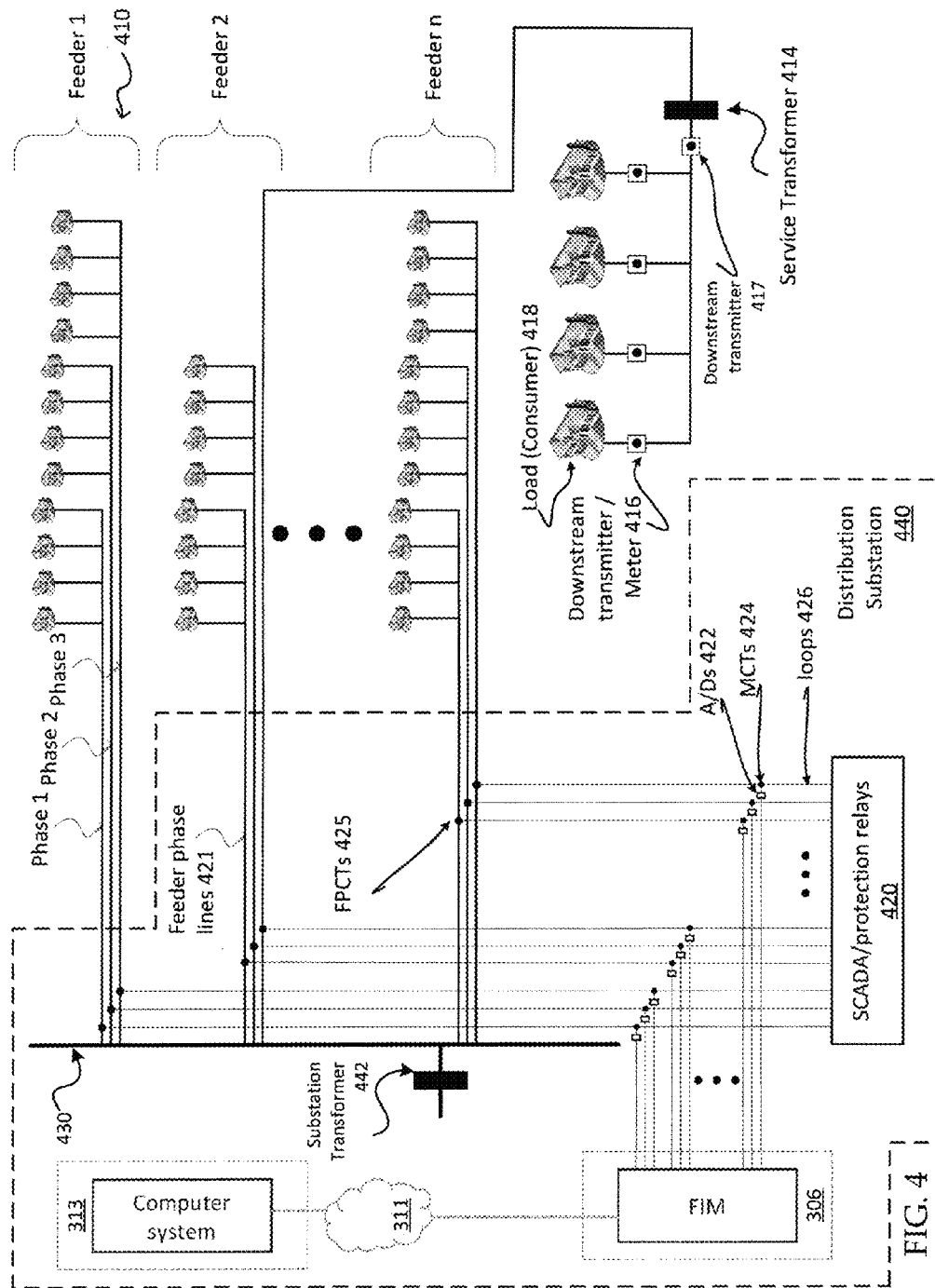
Figure 5:
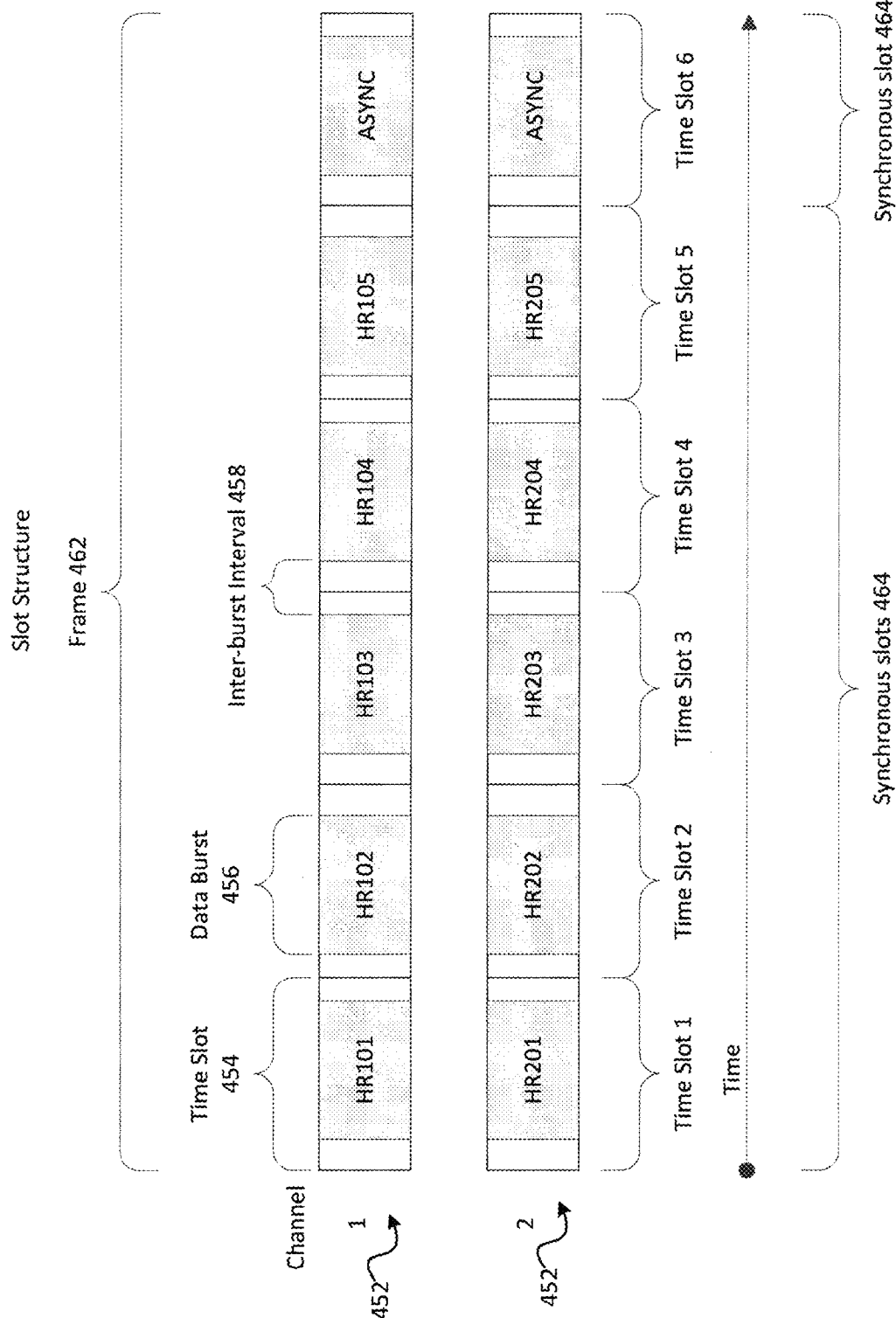
Figure 6:
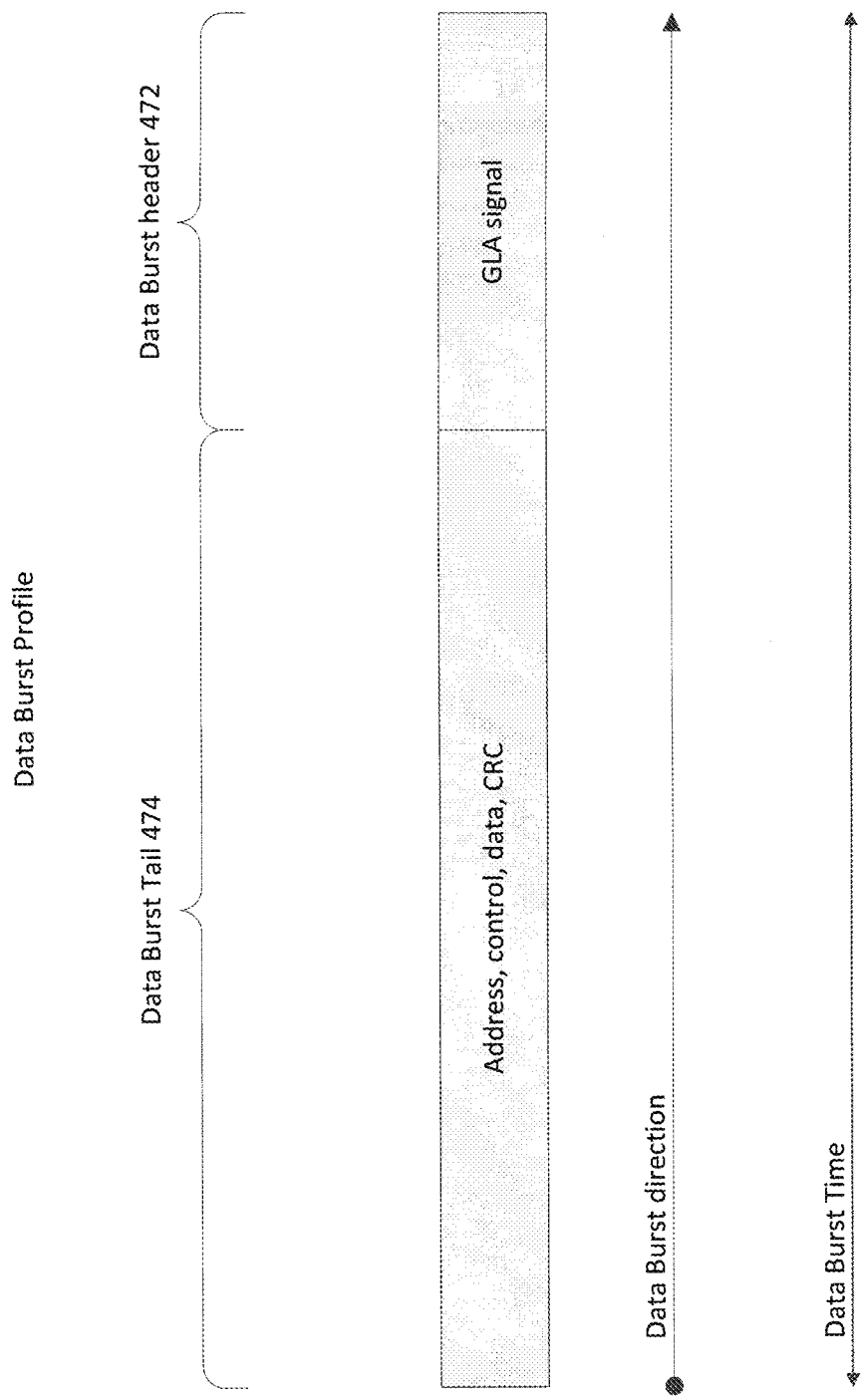
Figure 7:
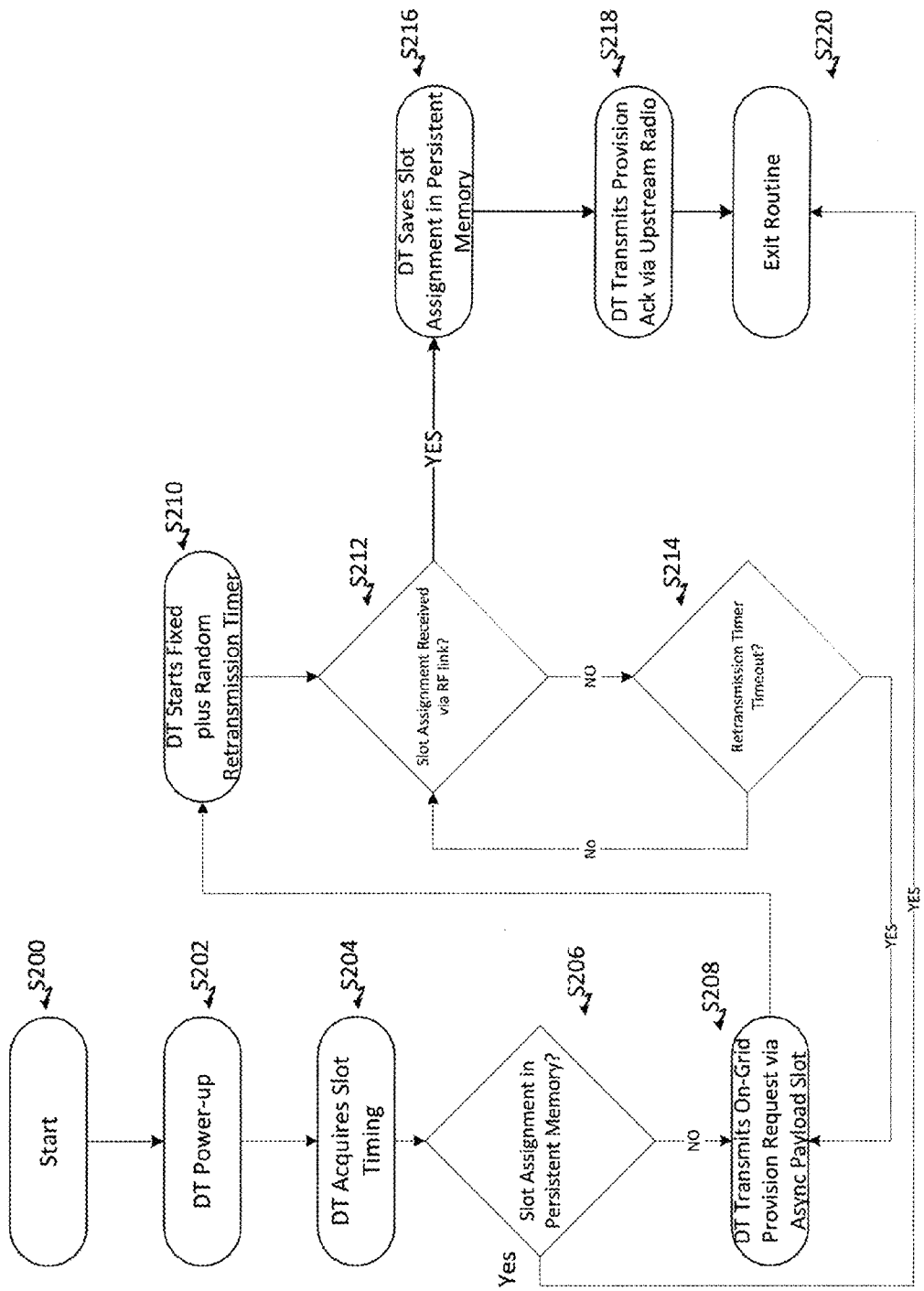
Figure 8:
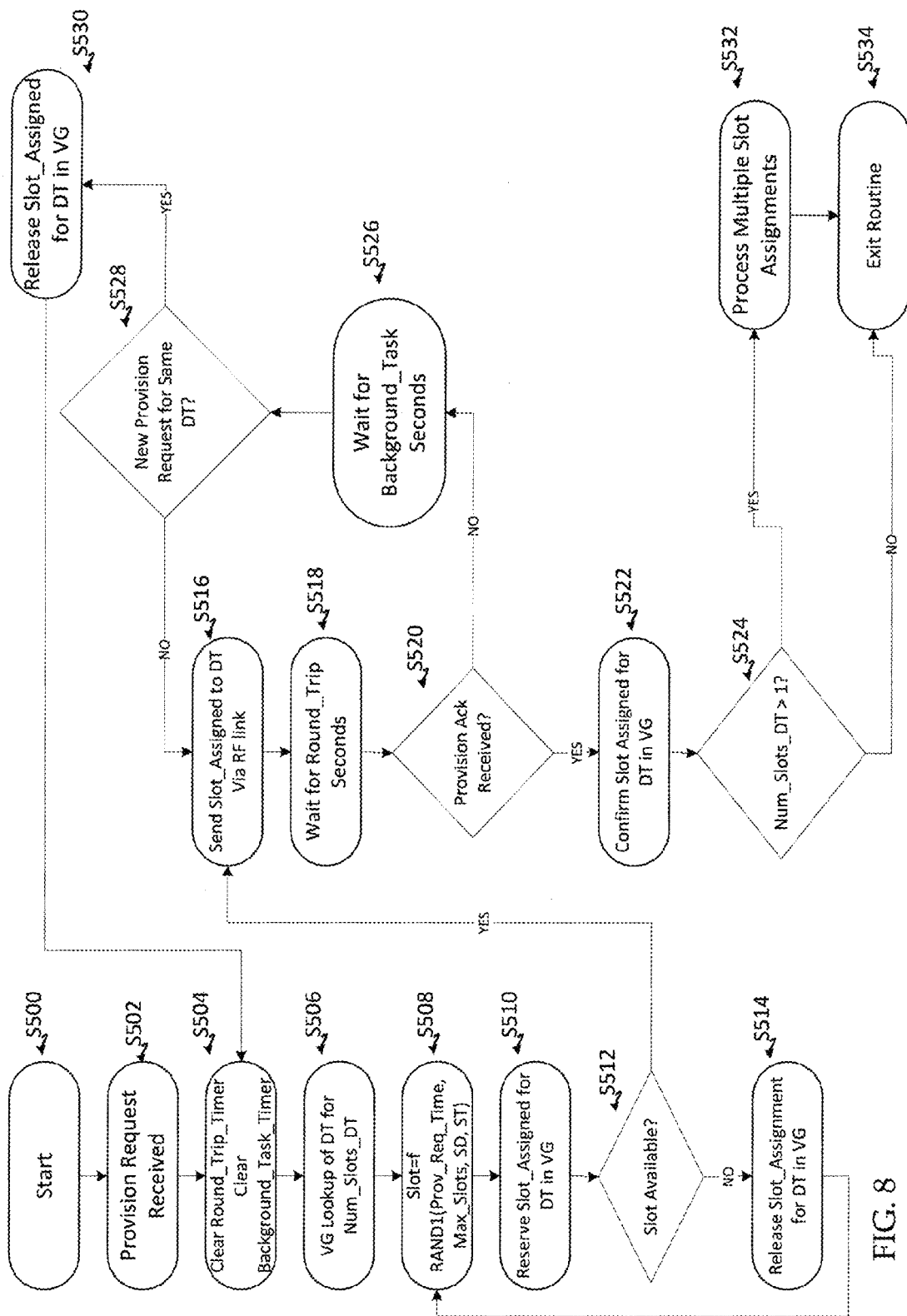
Figure 9:
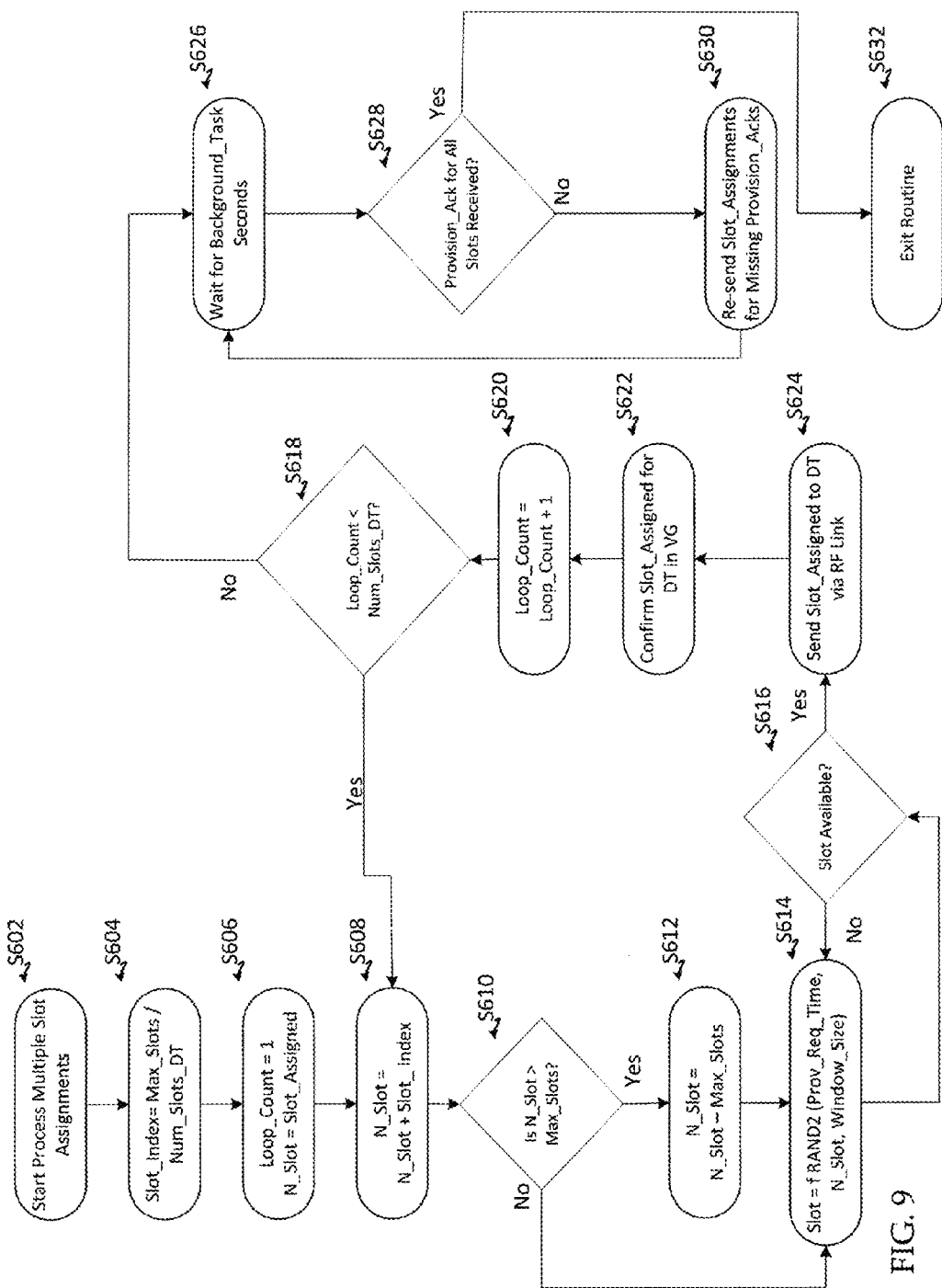
Figure 10:
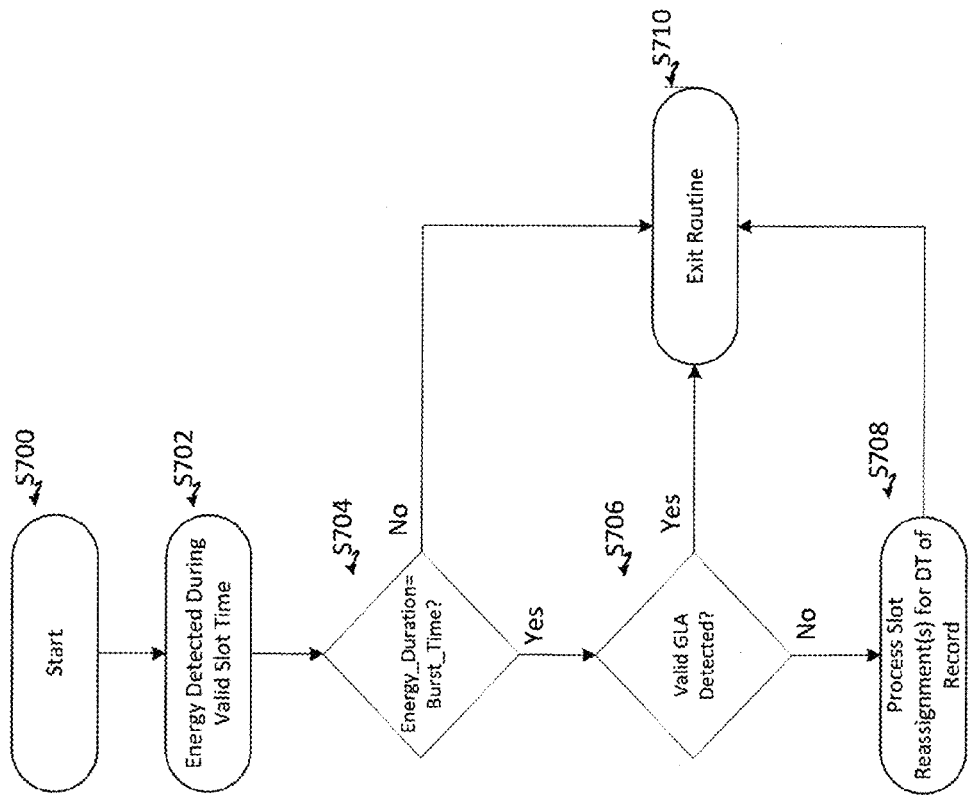
Figure 11:
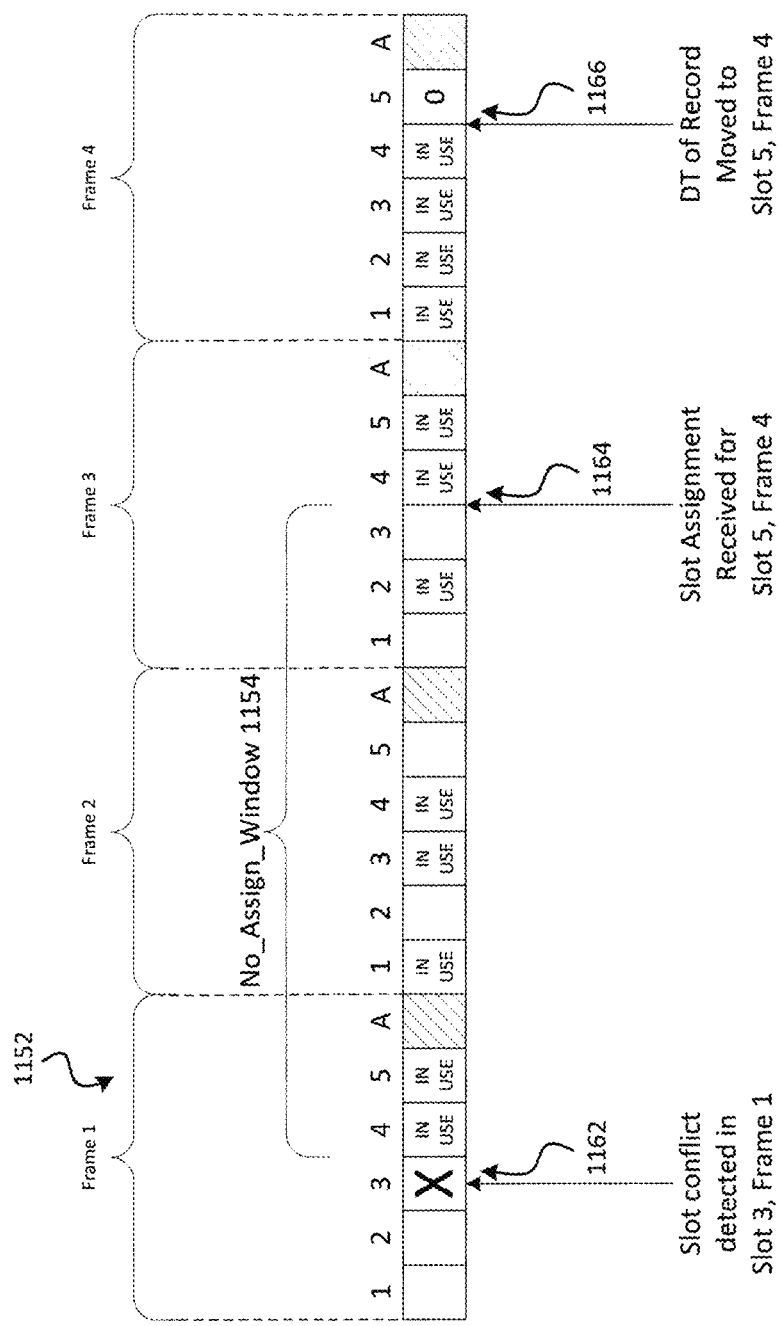
Figure 12:
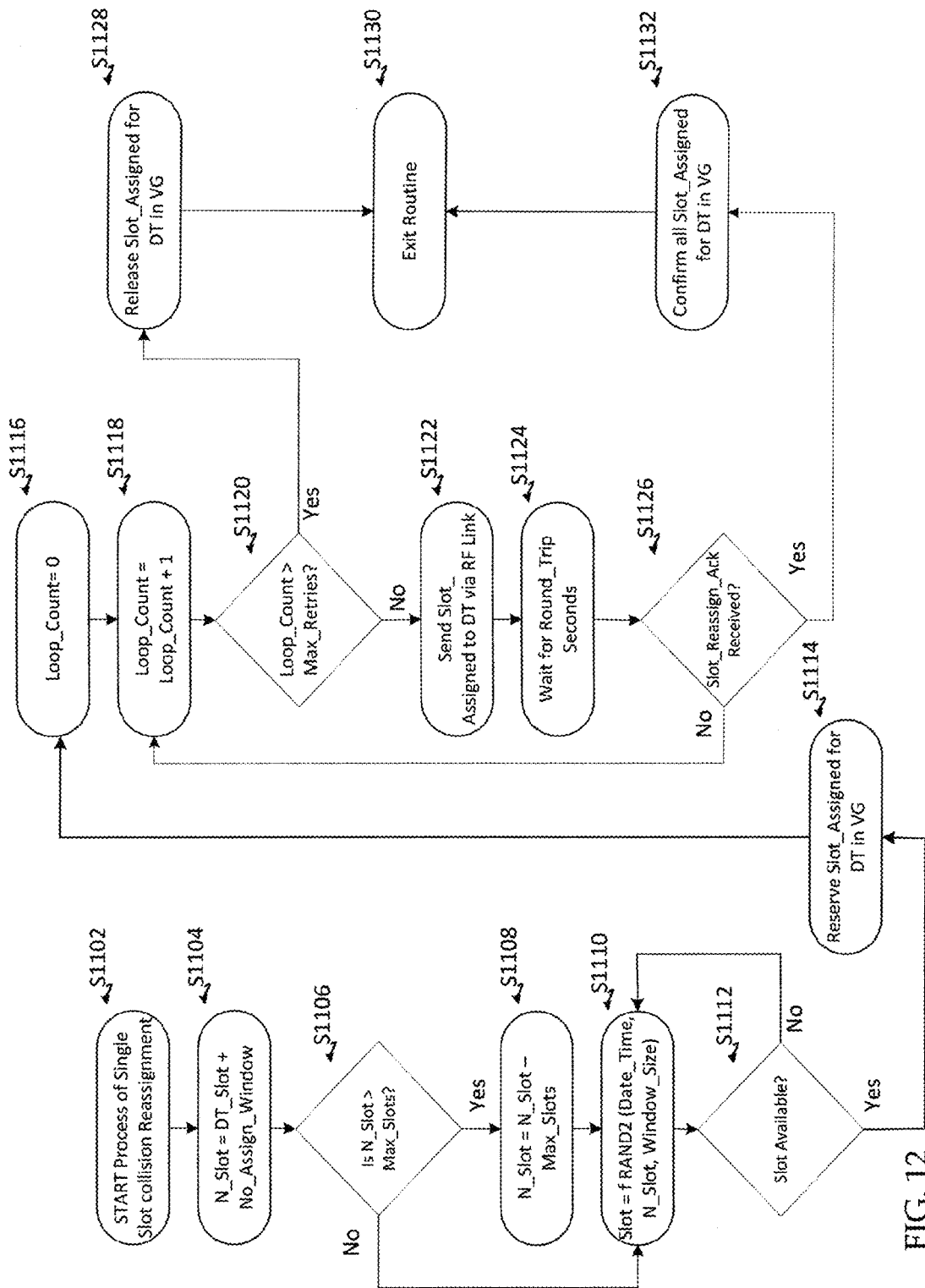
Figure 13:
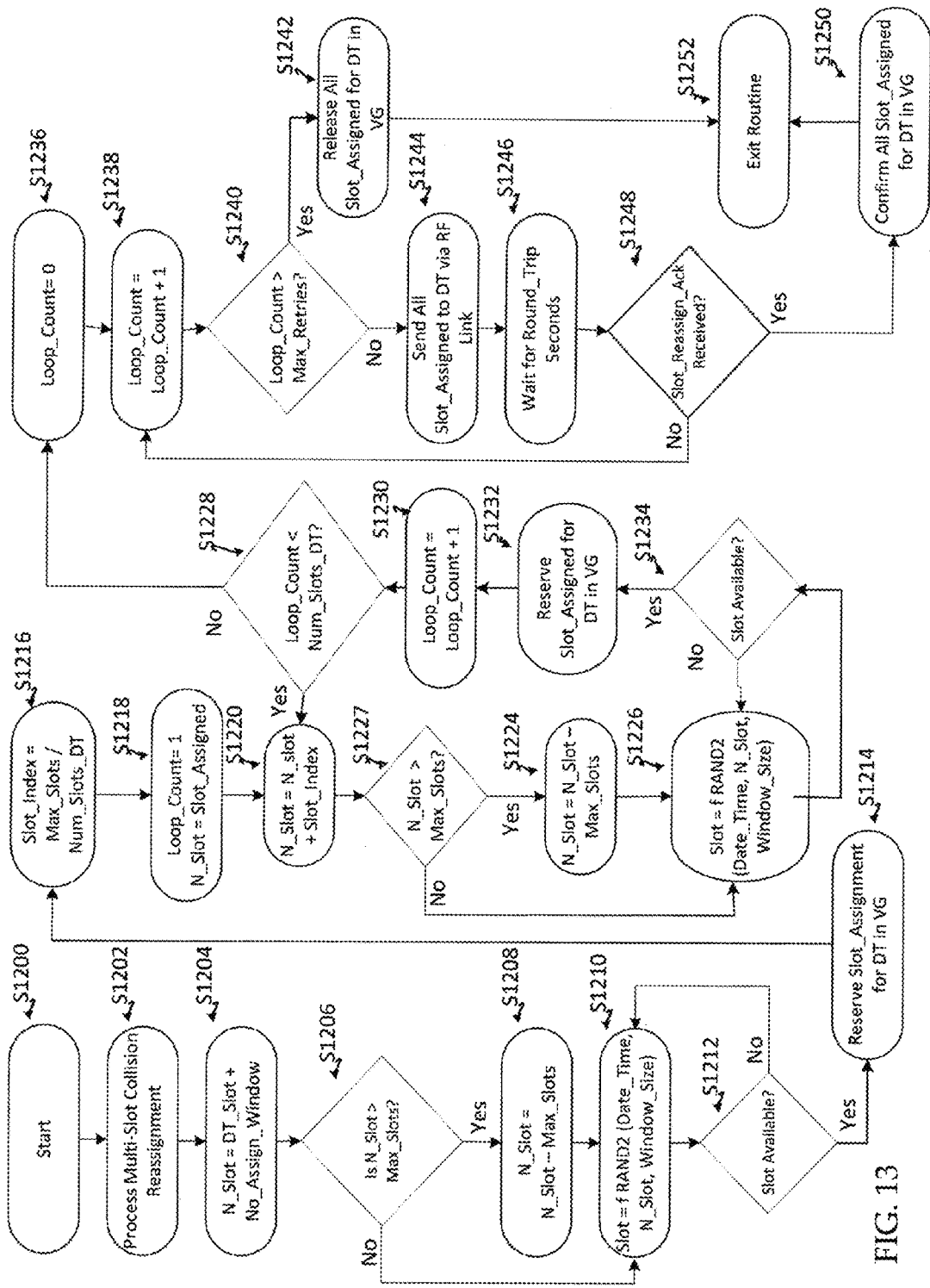
Figure 14:
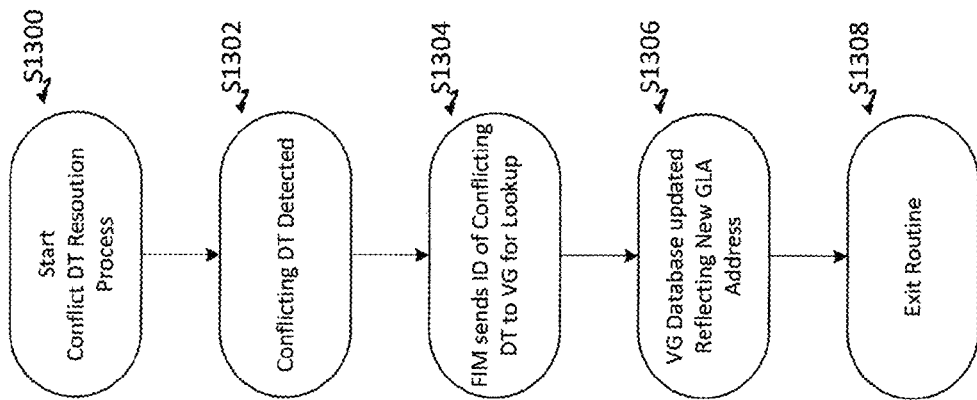
Figure 15:
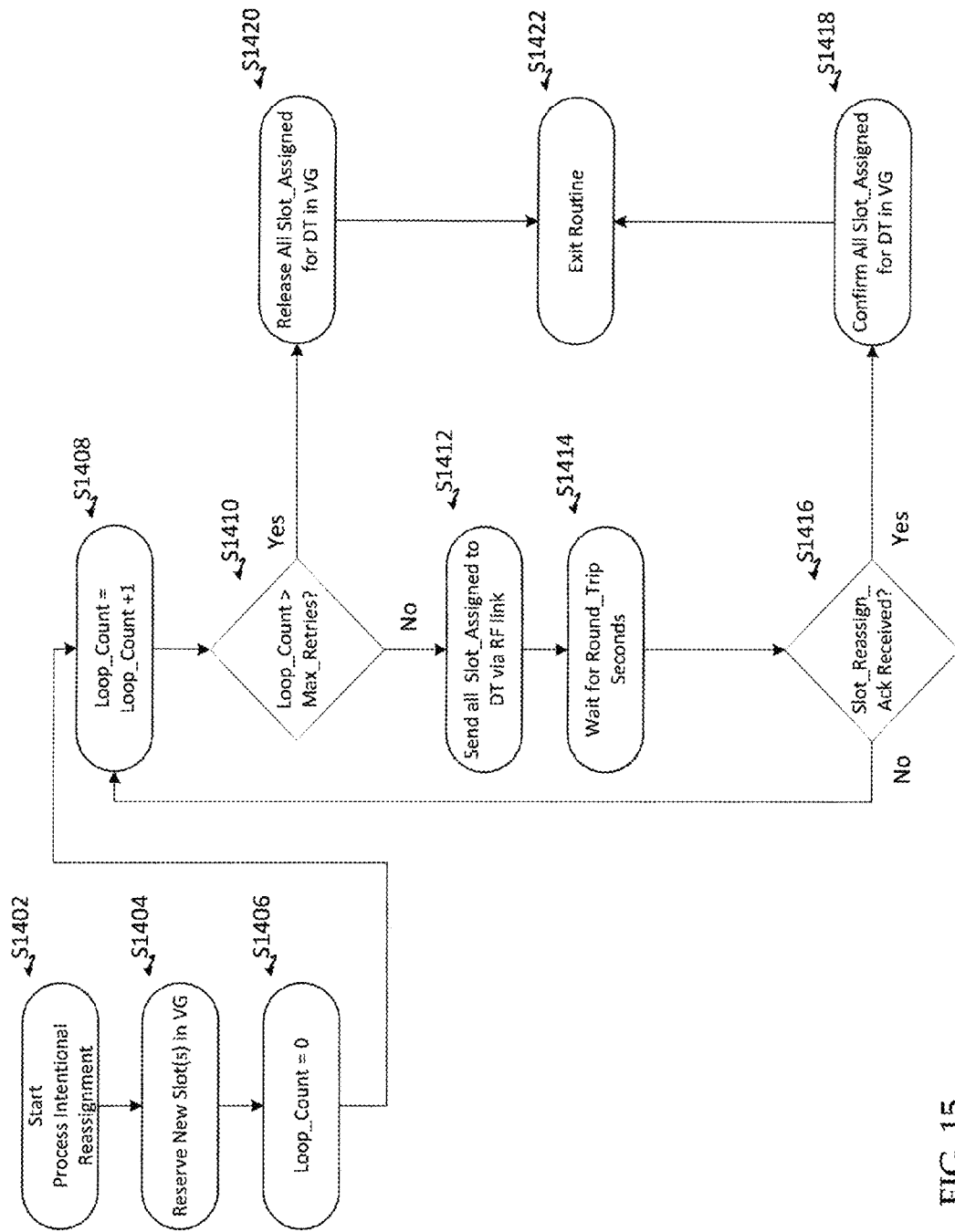

Correspondingly, referenced throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments. In the drawings:

FIG. 1 is a simplified illustration of the power path from a generation point to a distribution substation to a consumer, showing the high voltage, medium voltage, and low voltage regions of the distribution grid and depicting some of the major features of an electrical distribution grid;

FIG. 2 is a simplified illustration of a logical structure of domains of an exemplary electrical distribution grid, showing enterprise, region, substation, and transformer domains;

FIG. 3 is a simplified block diagram of the substation apparatus in a Grid Location Aware™ network, illustrating how the Grid Location Aware™ network apparatus couples to the existing SCADA and/or protection relay lines in the substation and how the data from the Substation Receiver is backhauled to a data center;

FIG. 4 is a simplified block diagram illustration of the invention showing major logical structures of the invention;

FIG. 5 is a simplified illustration of a portion of an exemplary slot structure showing six time slots in one frame from two channels;

FIG. 6 is a simplified illustration of a data burst profile showing a first part with a GLA preamble data and a second part having Address, control, data, or CRC data;

FIG. 7 is a simplified logical flow diagram of a methodology for an initial DT detection and assignment in accordance with an embodiment of the invention;

FIG. 8 is a simplified logical flow diagram of a methodology for a slot assignment in accordance with an embodiment of the invention;

FIG. 9 is a simplified logical flow diagram of another methodology for a slot assignment in accordance with an embodiment of the invention;

FIG. 10 is a simplified logical flow diagram of a methodology for a decision process to assign a new slot in accordance with an embodiment of the invention;

FIG. 11 is a simplified illustration of a slot reassignment depicting a slot conflict occurring in Frame 1, Slot 3, a new slot assignment received in Frame 3, and a DT of record being re-assigned to Frame 4, Slot 5;

FIG. 12 is a simplified logical flow diagram of a methodology for a single slot reassignment in accordance with an embodiment of the invention;

FIG. 13 is a simplified logical flow diagram of a methodology for a multiple slot reassignment in accordance with an embodiment of the invention;

FIG. 14 is a simplified logical flow diagram of a methodology for resolving a conflicting DT in accordance with an embodiment of the invention; and FIG. 15 is a simplified logical flow diagram of a methodology for an intentional reassignment of a DT in accordance with an embodiment of the invention.

DETAILED DESCRIPTION OF THE INVENTION

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical, or other changes may be made to the specific embodiments disclosed without departing from the spirit and scope of the present invention.

The following description is provided to enable any person skilled in the art to make and use the disclosed inventions and sets forth the best modes presently contemplated by the inventors of carrying out their inventions. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the substance disclosed.

The present invention discloses a system and method of resolving slot conflicts between DTs which may require dynamically re-assigning at least one DT to a different time slot. The present invention comprises a system and methods for constructing and operating an on-grid data collection network in such a way as to resolve conflicts between transmissions from DTs that occur during at least partially at the same time and/or on substantially the same channel. One of skill in the art will appreciate that, while the present disclosure emphasizes exemplary systems in which time division multiplexing (with or without frequency division channels) is employed, it will be possible to enjoy the benefits of the invention when applied to a variety of other systems. For example, a system and arrangement (including various methods and apparatus) based on, e.g., frequency division multiplexing, spatially separated multiplexing, or any other appropriate communication system, such as is known or becomes known in the art, would likewise be beneficially developed on the basis of the present invention.

In one aspect the system integrates with other adjacent networks and devices present at the edge, substations, and features of an electrical distribution network, wherein the other networks and devices may include Smart Meters and the AMI and a conventional network such as the Internet. The system and methods may also employ the capabilities of the integrated networks to otherwise change DT transmission time with a reduced communication to the DT without significant delay in changing the transmission time and without losing the data to be transmitted by the DT. This leads to the ability of the system to increase timely data flow from the edge of a distribution grid, thereby supporting increased accuracy in the monitoring of demands and supplies on the system. models to support Smart Grid applications such as conservation voltage reduction, volt/Var optimization, load balancing, fault isolation, and recovery management.

In an embodiment, the present invention determines the existence of a slot assignment conflict and then the identification of the DT that is in conflict that should have its slot assignment(s) reassigned. The invention determines the identification of the DT in any of various ways including, but not limited to, looking up the identification of the DT that is assigned that slot assignment, determining the identification of the DT based on information from the payload data of the signal that was received, and determining the identification of the DT based on inferring the feeder and phase that the signal was received on and some information from the payload data of the signal that was received. Then the invention finds an available time slot, or if the DT requires multiple slots, then the invention finds time slots, to reassign the DT to. The DT is sent the new slot assignment(s) and stores that information within its system. The computer system also stores the slot assignment(s) for the DT in its system.

It is often advantageous to have various equipment and components of an electrical power grid intercommunicate. The data associated with such communications can be transferred in a variety of ways. These include the application of dedicated and general-purpose electrical and optical transmission media, and various wireless schemes including existing cellular and satellite networks, among others. The present invention deals with the significant benefits available from employing direct data transmission through the power lines of the power transmission network itself.

Communication across the power transmission media is desirable because of the intrinsic presence of such media between components of the system. While alternative transmission mechanisms are often available to devices on a smart grid and those alternatives may come at a lower cost than grid-based communications, they lack the ability to provide information about the grid. Thus, for example, a cellular or satellite communication system may be available between a substation and a DT, but communications over the corresponding data channel may incur variable per-communication costs which may be relatively low when compared to the fixed costs associated with the related communication hardware.

The power transmission media of the network, however, forms a noisy and dynamic channel that inhibits the reliable transport of communication signals. In the course of normal events, operation of the network includes the switching of various transmission links in and out of service, the addition and removal of passive and reactive loads and the connection and disconnection of various centralized and distributed generating nodes. In addition, inductive and capacitive crosstalk, varying environmental factors and assorted failure modes of line-connected apparatus can result in the system as a whole having rapidly varying characteristics.

Because of these deficits and impediments, early efforts at on-grid data transmission were largely deemed to be failures and/or inappropriate for certain desirable applications. The current inventors, having given careful consideration to the potential advantages of such a system, and having applied new and hard-won understanding to the problems at hand, have developed certain novel approaches and inventions that provide the possibility of an effective communication methodology where previously none was available. The result includes certain inventive improvements and novel apparatus, methods and systems for the transmission of data across a power transmission network.

Among the problems discovered by the present inventors to be significant in providing the previously desired, but unavailable functionality was a need to provide reliable data communication in the face of the inadvertent overlapping of signals that were otherwise intended to be time multiplexed. In actual physical systems, such signal overlap may result from dynamic changes on the network including, among others, the switching of applicable feeders and/or phases, the switching of loads, system crosstalk, device reset activity, and signal reflections at various physical impedance transitions present in the network. This undesirable signal overlap is included in the term "data conflict" and the present invention includes, inter alia, various systems, methods and apparatus for slot assignment and conflict resolution.

In certain preferred embodiments, the slot-assignment and conflict resolution features of the present invention will achieve, among other objectives:

1. the ability to provide a DT introduction as the basis for further communications between DT and central devices with or without a priori knowledge of the circuit topology and provisioning information;

2. the ability to detect and address asynchronous foldovers (i.e., circuits or potions of circuits transferred from one element of the grid to another element of the grid) and provide subsequent conflict resolution; and 3. the ability to manage intentional and/or arbitrary slot reassignments.

As will become apparent in light of the following discussion, DTs include any of a variety of devices and systems, such as, e.g., general-purpose systems and systems with embedded computer technology, that are present in the vicinity of a consumer of electrical power, where that electrical power is received across a power transmission network. By convention the grid location of such a consumer is generally referred to as the "edge of the network." Central devices will be found in a variety of locations within the network that are distal with respect to the edge of the network and, most typically in the present context, at or in the vicinity of a power transmission substation.

A "slot," as in "slot assignments" and "time slot" will refer, for example, to the time intervals assigned by convention to various payload time intervals within a time-multiplexed data transmission. This will become clear to a reader of ordinary skill in the art in light of further description to follow below. Likewise, the meanings of the terms "foldover", "asynchronous foldover", "transmission conflict" and "conflict resolution" will become clear to the skilled reader in the course of the following disclosure. As these terms become understood, the nature and meaning of "slot reassignments" will naturally emerge to the reader.

Although a general understanding of power transmission grids, including "Smart Grid" technology and "Advanced Metering Infrastructure" will be possessed by the practitioner of ordinary skill in the art, the following description of typical network conventions and topology is provided for additional clarity.

An electrical power grid is generally considered to be composed of two topological regions, the Transmission Grid(s) and the Distribution Grid(s). The Transmission Grid originates at large generation points such as hydroelectric dams, nuclear reactors, wind farms, and coal-fired or gas-fired power plants. Power from the generation point is transmitted as high-voltage alternating current (AC) over a loosely connected network of long, high-voltage lines to points where demand for power exists, such as factories, farms, and population centers. Distribution Substations are typically located at various points on the periphery or edge of a transmission grid.

FIG. 1 illustrates a typical segment of an electrical power grid. An electrical power grid is generally considered to be composed of two logical regions, the Transmission Grid(s) and the Distribution Grid(s). The Transmission Grid originates at large generation points, e.g., power plant 120, such as hydroelectric dams, nuclear reactors, wind farms, solar farms, and coal-fired or gas-fired power plants. Power from the generation point is transmitted as high-voltage alternating current (AC) over a connected network of long, high-voltage lines to points where demand for power exists, such as factories, farms, and population centers. At the edges of the Transmission Grid there is a collection of Distribution Substations, e.g., distribution substation 124. Distribution Substations contain one or more Substation Transformers which step down the voltage from high transmission line levels (typically 130 kV to 700 kV) to the medium voltage levels (currently typically from 4 kV to about 35 kV in the United States, higher voltages are currently used outside the United States, although the specific distribution voltage is not germane to the invention) at which power is distributed to consumers within a distribution service area.

At the edge of the Distribution Grid are a number of Service Transformers, e.g., service transformer 136, which transform the medium voltage of the distribution grid to lower voltages (in the United States, typically 120V, 208V, 240V, 277V, or 480V). Other voltages in addition to some of these can be used elsewhere in the world. In some cases, a tier of one or more transformers, called step-down transformers, e.g., transformer 128, lying schematically between the Substation Transformers and the Service Transformers, create intermediate voltage reductions between the Substation and the Service Transformers.

Each Service Transformer powers one or more metered, e.g., using meter 142, or unmetered loads. A load, e.g., load 150, can be a dwelling, a commercial or industrial building, an element of municipal infrastructure such as a series of street lamps, or agricultural apparatus such as irrigation systems. A typical distribution grid includes other elements used to control, balance, and regulate the flow of power. Examples of such elements are capacitor banks, e.g., capacitor bank 132, voltage regulators, switches, and reclosers.

Distribution grids have been designed and deployed in a variety of topological configurations. In the United States, distribution grid types are typically characterized as radial, loop, or networked. Other emerging cases are the campus grids and microgrids. Additional topologies, not described, are used elsewhere in the world. In a radial grid, a substation has one or more substation transformers. Each substation transformer has one or more substation busses. One or more three-phase feeders "radiate" outward from each substation bus, with single-phase, or three-phase lateral lines branching off from the feeders, and tap-off points (or simply "taps") in turn branching from the laterals. Radial grids are inexpensive to design and build because they are simple, but they are most vulnerable to outages because they lack redundant power paths, so that any break causes at least one load to lose power. Network and loop grids are also well known to one of skill in the art and are equally amenable to supporting corresponding embodiments of the invention.

A distribution substation receives high-voltage power from the transmission grid into one or more large power transformers. A distribution transformer may incorporate a type of regulator called a load-tap changer, which alters the voltage that the transformer delivers to a power distribution bus (a substation distribution bus) by including or excluding some turns of the secondary winding circuit of the transformer, thereby changing the ratio of input to output voltage. Certain embodiment of the invention will operate properly notwithstanding changes in these turns ratios. One or more feeders emanate from the substation bus. If too many feeders are required in order to service the loads or topology, additional transformers and busses are used.

FIG. 2 is a simplified illustration of a logical structure of domains of an exemplary electrical distribution grid, showing enterprise, region, substation, and transformer domains. A power transmission grid can be viewed as consisting of a hierarchy of functional and logical domains "Domains." A top level domain is referred to as an "Enterprise Domain." An Enterprise Domain (ED), e.g., Enterprise Domain 210, typically encompasses the entire distribution grid of a business stemming from an electrical generation system, e.g., a power plant to the edges of the grid. An Enterprise Domain 210 will generally encompass several "Regional Domains," e.g., Regional Domain 214. A Regional Domain (RD) can be further broken down into at least one Substation Domain, e.g., Substation Domain 220. Typically, a Substation Domain includes the circuitry of a substation and circuits downstream.

A Substation Domain (SD) 220 can be further broken down into at least one Transformer Domain, e.g., Transformer Domains 222, 224, 226. A Transformer Domain includes a substation transformer converting voltage from transmission voltage to distribution voltage, and all circuits downstream of that transformer. In the current presentation, unless otherwise indicated, a "domain" will refer to a Substation Domain. Generally, a physical substation will include one or more transformers, each defining a Transformer Domain. Each transformer domain can have various types of arrangements of circuits downstream. Each transformer provides one or more feeders and, conventionally, each feeder consists of three phases. It is conceivable to have a grid that includes several transformers, with each having one or more feeders, each feeder having three phases and supporting various subordinate circuitry. It will be appreciated by one of skill in the art, however, that other phase arrangements are possible and are considered to be within the scope of the invention.

In order to monitor and control the components of the grid, feeder/phase current transformers (FPCTs) are attached to power-bearing conductors within the substation. The FPCTs output a relatively low alternating current (typically up to 5 amps) on a looped conductor which is accurately proportional to the current flowing through the high voltage conductor being monitored. These low-current outputs are suitable for connecting to data acquisition subsystems associated with Supervisory Control and Data Acquisition (SCADA) systems or relay protection systems in the substation. FPCTs are designed and built into the substation, because changing or adding FPCTs to the high-voltage components is impossible or dangerous while current is flowing. On the other hand, additional monitoring CTs (MCTs) may be safely added around the low-current loops as needed without impacting power delivery, the protection circuits, or the accuracy of the SCADA system.

In addition to the power lines themselves, the distribution grid contains numerous other devices intended to regulate, isolate, stabilize, and divert the flow of power. These devices include switches, reclosers, capacitor banks (usually for power factor or voltage correction), and secondary voltage regulators. All these devices affect the behavior of the distribution grid when considered as a data-bearing network, as do the various loads and secondary power sources on the grid. Devices that have abrupt state changes will introduce impulse noise on the grid, as can loads turning on and off. Some devices, such as transformers and capacitor banks, filter and attenuate signals at certain frequencies and can cause cross-talk of signals above the fundamental frequency of the power delivery system.

Other than the wires connecting a consumer load and the associated meter to a service transformer, the service transformer is typically the outermost element of the distribution grid before the power is actually delivered to a consumer. The meter is attached at the point where the power from the service transformer is delivered to the consumer. Service transformers can be three-phase or single phase, as can meters.

Traditionally, reading meters was one of the largest operational costs incurred by electrical utilities. Original electric meters were analog devices with an optical read-out that had to be manually examined monthly to drive the utility billing process. Beginning in the 1970s, mechanisms for digitizing meter data and automating its collection began to be deployed. These mechanisms evolved from walk-by or drive-by systems where the meter would broadcast its current reading using a short-range radio signal, which was received by a device carried by the meter reader. These early systems were known as Automated Meter Reading systems or AMRs. Later, a variety of purpose-built data collection networks, employing a combination of short-range RF repeaters in a mesh configuration with collection points equipped with broadband backhaul means for transporting aggregated readings began to be deployed. In time, two-way purpose-build collection networks utilizing two-way paging technology and cellular communications were also deployed, either as independent systems, or as a portion of a complex purpose-build data collection system.

These networks were capable of two-way communication between the "metering head-end" at a utility service center and the meters at the edge of this data collection network, which is generally called the Advanced Metering Infrastructure or AMI. AMIs can collect and store readings frequently, typically as often as every 15 minutes, and can report them nearly that often across an entire deployment. They can read any meter on demand provided that this feature is used sparingly, and can connect or disconnect any meter on demand as well. AMI meters can pass signals to consumer devices for the purpose of energy conservation, demand management, and variable-rate billing. Because the AMI network is separate from the power distribution grid, AMI meters are neither aware of nor sensitive to changes in the grid topology or certain conditions on the grid. Nonetheless, the introduction of AMI is generally considered to be the beginning of the Smart Grid.

Many characteristics of the electrical distribution infrastructure have limited the success of efforts to use the grid itself as a communications medium. First, the grid is a noisy environment. State changes in loads on the grid, as well as control and regulation artifacts on the grid itself, cause impulse noise on the power line. Normal operation of loads like electrical motors, simple variations in the overall load, and ambient RF noise (chiefly from lightening and other weather-related causes) add up to significant Gaussian noise.

The measured noise floor at a typical substation in the United States sits at about 80-90 dB below the maximum amplitude of the line fundamental frequency. The complex impedance of the grid varies across both the frequency and time domains. This may lead to loss of signal at an on-grid receiver sited at a higher voltage point on the grid when impedance increases, or alternately force the on-grid transmitter to use more energy than would be necessary on the average.

Capacitor banks sited at points along the grid for the purpose of optimizing power factor can cause signal attenuation. These capacitor banks can be static values or dynamic values, which are changed manually or automatically. Most significantly, transformers act as low-pass filters, dramatically attenuating signals above a certain frequency. The effective passband is not the same on every distribution grid, because different arrangements and types of transformers are employed and because the transformers themselves are not deliberately tuned to filter at a specified frequency above the fundamental. All these variables impact the frequency response of the grid as a transmission medium.

Additionally, injecting modulated current signals on the grid may cause interference between the injected signals themselves. One problematic phenomenon is crosstalk, where a signal injected on one power line is detectable on another line. When crosstalk occurs on two or more phases of the same feeder, it can be caused by inductive and/or capacitive coupling as the phase lines run alongside one another for most of the length of the feeder. Crosstalk may also be due to multiple phase windings on the same transformer core, and may be caused by reflection of the injected signal off the power bus at the substation.

Feeder-to-feeder crosstalk has also been measured, and may be caused by reflection of the injected signal off the power bus at the substation. As will be further discussed below, the amplitude of a signal received at a substation may be higher (at some frequencies) on a crosstalk channel (feeder/phase), than on the originating feeder/phase. Given the complexity, diversity, and age of the distribution grids in the United States and the world, less is known about these phenomena at frequencies above the fundamental than might be expected.

FIG. 3 is a logical block diagram of the intelligent platforms of one embodiment of the invention, showing where the processing elements reside with respect to a network. The exemplary network illustrated includes a wide area network such as the Internet, an AMI, and a medium voltage electrical distribution grid, or other such medium. Connected at the edge, or an internal junction point, of the medium voltage electrical distribution grid is at least one DT.

FIG. 3 shows that the system may be divided into three regions or tiers. The edge tier 301 includes at least one DT. The DT, e.g., DT 305, can be located at a service transformer 303 or the DT, e.g., DT 304, can be located at a power consumption site underneath the service transformer.

The invention does not require the installation of communication devices or other modifications between the edge tier and the substation tier. However, if it is desirable to collect data from a feature of the medium-voltage grid, such as a capacitor bank, a variation of the DT may be installed there. Such a DT is technically still at the Edge Tier, since it is powered by a low-voltage outlet located at the feature, and not directly from the medium-voltage line(s) upon which the grid feature is installed.

Still referring to FIG. 3, the substation tier 306 comprises at least one Substation Receiver 307 operable to receive transmissions from the DT in the edge tier, or intermediate junction point, without recourse to any signal amplifiers, bypass mechanisms, or bridges installed on the medium voltage infrastructure of the electrical distribution grid. The Substation Receiver(s) connect via a local area network to a Computing Platform 308 containing non-volatile computer-readable memory and a CPU for storing and executing the software 309 which maintains the Inventory and Grid Map databases and carries out the tasks of provisioning and managing the data network. One of skill in the art will appreciate that, while a computing platform containing non-volatile computer readable memory is described above, any of a wide variety of computing platforms and computing systems or computer systems may be used in the practice of the present invention. Likewise, those of skill in the art will understand that such systems may be modified in any way that is known, or that becomes known, so as to more fully enjoy the benefits of the present invention.

Additionally the Computing Platform stores and executes software 310 which processes the Inventory and Grid Map data in combination with messages received from the Substation Receiver 307 to infer information about the state of the Grid over and above what the Substation Receiver alone can detect based only on incoming transmissions. The combination of the substation receiver 307 and its associated computing platform 308 is also referred to as a Feeder Intelligence Module (FIM).

In an embodiment of the invention, a substation receiver 307 includes a number of analog-to-digital (A/D) converters, although typically depicted as the A/D converter being located outside of a substation receiver 307. Each A/D converter is coupled to a prospective sensor on each feeder phase looped conductor, i.e., each phase of each feeder supports an A/D converter. In one embodiment, the signals received from the phases of the feeders are current wave forms. In one approach, the A/D converter is located near each MCT on each respective feeder phase input line. (FIG. 4)

The FIM includes MCTs coupled to the outputs of the FPCTs. The outputs of the MCTs are, in turn, connected to the inputs of the A/D converters respectively. Desirably, the A/Ds are located near the respective MCT on each feeder phase current loop. (FIG. 3) In one approach, when processing signals, the substation receiver 307 ignores signals at the grid's fundamental line frequency and its integer harmonics.

Referring back to FIG. 3, each distribution substation has at least one substation transformer. Depending on the type and number of loads connected to the substation, there may be more than one substation transformer in a substation. The substation transformer and its topology-the circuits and features between the substation transformer and its loads, inclusive-is generally referred to as a Substation Domain. In an exemplary case, the system includes a substation receiver 307 uniquely associated with each substation transformer. In this exemplary case, the substation tier 306 has two substation domains corresponding to the two substation receivers 307. In other approaches, a substation receiver 307 is shared by more than one substation domain, or a substation domain has more than one substation receiver.

In some embodiments of the invention, the computer-based components of the Substation Receiver and the Computing Platform components are hosted on the same processing subsystem. In such embodiments, the communications protocol (such as HTTP) used to transfer data between the Substation Receiver and the Computing Platform software components need not change, even though there is no physical local area network required.

In one embodiment, Computing Platform 308 connects to a conventional wide area network 311, such as the Internet, for the purpose of communicating with a Concentrator 312 in a data center tier 313. In some embodiments of the invention, and regardless of whether the Computing Platform and Substation Receiver are co-located or on separate processing subsystems, the processing subsystems may be configured in a redundant cluster to ensure continuous operation of the system.

Referring again to FIG. 3, in certain embodiments the Concentrator 312 hosts software with an analogous architecture to the software in the substation(s). Such an architecture may include a network and data management component 314 providing software services to one or more applications 315 for GLA. The applications use conventional network-based messaging protocols such as, but not limited to, JMS, SOAP, and REST to publish information to subscriber applications such as a Geographic Information System (GIS) 316.

The data and network management component 314 may integrate with an AMI head-end 317 for the purpose of causing the AMI network to broadcast data blocks to the DTs in the edge tier 301 or at intermediate junction points. Data and network management component 314 may integrate with AMI head end 317 using a standard protocol and/or a proprietary interface.

Other embodiments of the invention may employ alternative ancillary network components. For example, Substation-to-Edge broadcast capability and/or time synchronization from the substations to the DTs may be provided by medium-voltage PLC transmitters attached to the feeders at the substation rather than using an AMI for this purpose.

Likewise, a separate radio transmitter broadcasting messages originating at the distribution substation may be employed. The radio transmitter does not need to be physically located at the substation as long as there is a communications path from the Computing Platform at the substation to that transmitter. A single radio transmitter may serve as the Substation-to-Edge channel for a multiplicity of substations. When the Substation-to-Edge channel is not an AMI, synchronization of the DT clocks may be provided as described in U.S. patent application Ser. No. 13/566,481, titled System and Methods for Synchronizing Edge Devices on Channels without Carrier Sense, which is incorporated herein by reference. One of skill in the art will appreciate that, in embodiments of the invention where channels are not time slotted (for example, TDMA), clock synchronization is unnecessary.

FIG. 4 is a simplified block diagram of a typical distribution substation apparatus in a GLA network and edge of the grid topology. FIG. 4 includes a distribution substation 440 which includes a substation transformer 442 which is electrically coupled to a distribution bus 430, which, in turn, is electrically coupled to feeder phase lines 421. The edge of the grid includes a plurality, e.g., n, of feeders 410, each feeder 410 having three feeder phase lines 421. Each respective feeder phase line is typically connected to a load 418 through a service transformer 414. A DT 417 is located near a service transformer 414 and/or a DT 416 is located next to/or part of a meter. The distribution substation 440 also includes a SCADA/protection relay 420 which is electrically coupled to feeder phase lines 421 through loops 426, respectively. The FIM is also electrically coupled to loops 426 through A/D converters 422 and MCTs 424, respectively.

FIG. 4 details how in, one embodiment, the FIM monitors the feeder phase lines 421 on the low-voltage side of the substation transformer 442 by attaching MCTs, e.g., MCTs 424, to the SCADA/protection relay loops, e.g., loops 426, already in place to the SCADA, or protection relay, 420. This coupling method allows a Substation Receiver to be installed in a distribution substation without disrupting the operation of the substation. Other coupling methods such as hot-stick clamp-on current transformers are well known in the art, and may be equivalently employed in lieu of the secondary coupling to SCADA loops described herein. Some distribution substations 440 may lack SCADA loops 426, or existing loops may be inaccessible due to physical placement or utility regulations.

FIG. 4 also shows the MCT 424 connections to the A/D converters 422. The A/D converters 422 digitize the analog current signal read from the output of the MCTs, which output is proportional to the current flowing through the corresponding feeder phase as measured by its FPCT 425. In certain embodiments, the resulting digitized signal is conveyed to one or more FIM computing element by means of one or more FIM switches (not depicted in FIG. 4 for reasons of simplicity). As one of skill in the art will appreciate that, in an exemplary system, the computing element will include, but is not limited to, one or more of a conventional microprocessor-based computer, a Digital Signal Processor, or other signal processing device such as a Field Programmable Gate Array and/or Graphics Processing Unit. In certain embodiments, the FIM encompasses all of the electronics of a substation receiver, not all necessarily in the same rack. The FIM switch performs several functions including collecting signals from the A/Ds. FIM switches also provide power over the Ethernet connection to the A/Ds 422.

Despite the many engineering difficulties inherent in using the power grid as a communications medium, it has remained attractive to electrical utilities because the utility already owns the infrastructure, and it is present at all the points where the utility needs to collect data. Under the umbrella name Power Line Communication or PLC, some medium-frequency power line protocols have been used with success for Smart Grid applications. Despite their limitations, low-frequency systems have achieved market penetration in rural areas where wireless systems are cost-prohibitive.

High frequency communications require additional equipment to allow the signals to cross transformers and capacitor banks. Such signals can also be severely attenuated by passage through underground cables, and can radiate RF signals on overhead lines. Consequently this technology has not been widely adopted.

The problems with, and limitations of, the high, medium, and low-frequency PLC methods as discussed above have led in the $21^{st}$ century to rapid development of custom built wireless networks for AMI data collection in the United States. High-frequency on-grid methods have proven to be too expensive, not sufficiently reliable, and too fraught with error and uncertainty to be commercially viable. Low-frequency methods can be implemented with low-cost edge-to-substation transmitters, but these lack the data-bearing capacity required by modern AMI. Moreover, on-grid low-frequency substation-to-edge transmitters like AFRC are large, expensive, and have undesirable side effects which limit their use in urban settings. One possible option would be to use high-frequency substation-to-edge transmitters in conjunction with low-frequency edge-to-substation transmitters. However, in the United States, market forces have led to the rapid penetration of wireless AMI systems, especially in urban and suburban areas.

Cost constraints and availability of unregulated spectrum have dictated the use of low cost mesh architectures within AMI networks, with neighborhood concentrators that collect data from a grouping of meters and use traditional infrastructure (POTS, fiber, or cellular) for backhaul to data centers. Mesh architecture means that, although the RF transceivers used have individually high data rates, the edge networks are easily saturated. Most of the available data bearing capacity in these networks is used just for reporting meter interval data, with limited capacity reserved for firmware updates and control packets for applications such as demand management.

There are two major factors that limit the utility of the existing AMI infrastructures. The first is, of course, the capacity limitations of the mesh. The second, and more significant, is the fact that the AMI network is not congruent with the electrical grid. It is capable of providing little information about the operational state of the grid, and is not knowledgeable of the schematic configuration of the gird. This is unnecessary for meter reading, but more sophisticated Smart Grid applications (for energy conservation, asset protection, load balancing, fault isolation, recovery management, and non-technical and technical loss determinations) require accurate information about the schematic relationships of various assets (such as grid assets, load and conditions on the several segments of the grid, and the current state of bi-modal and multi-modal assets). This information, together with the geospatial locations of the same assets, is called the Grid Map.

Utilities typically maintain two maps or models of the Grid. A Physical Network Model (PNM) aggregates the geospatial location of the assets on the grid. PNMs thanks to modern GPS technology, are reasonably accurate with respect to point assets such as substations, capacitor banks, transformers, and even individual meters. Inaccuracies stem from failure to update the maps when repairs or changes are made. For example, a service transformer may be moved from one side of a street to the other as a result of street widening.

Longitudinal assets, especially buried cables, are less well represented in the PNM. The PNM can contain as-designed data, but since, in many places, the cable was laid before global positioning technology had matured, the designs were based on ground-level surveys. Subsequently, original maps may or may not have been updated to reflect changes. Later surface changes complicate the problem of verifying the geographic path taken by medium-voltage distribution lines.

The second model is the Logical Network Model, or LNM. LNMs describe how grid components are connected, without reference to their geospatial location. The LNM changes frequently. During the course of repairs, the way transformers attach to taps and laterals, and meters attach to transformers, may be altered. Such changes affect both the LNM and the PNM.

In many utilities, such changes are recorded manually by field agents. The manual reports may or may not be updated in the LNM and PNM and, when updates are made, the time lag between maintenance occurring and its being recorded is variable. Additionally, many grid components, especially regulators, switches and reclosers, change state asynchronously and/or automatically. Unless these components are instrumented with communications back to a data center, rather than simply being subject to local control systems, such dynamic changes are not reflected in the LNM. They do, however, affect the power path, the load and environmental stress on other components of the distribution grid, and the service level to consumers.

Examples of significant but not reliably known aspects of the (actual) Grid Map are the feeder and phase by which each meter is currently powered. Other significant factors include the relative load on each phase of each feeder, especially on subordinate branches (laterals) of the grid, the actual voltage supplied to each meter, the power factor along the edges of the grid, and whether all the power drawn at a transformer is metered. Additionally, it is important know the state of switch sets, local connections, or protection devices such as fuses, especially after a weather event that has caused outages.

If this information were reliably known, utilities could conserve energy (much of the savings from which would pass on to consumers), save maintenance costs, prolong the life of equipment in the field, improve the efficiency and life of utility and consumer equipment, avoid outages, reduce recovery times after unavoidable outages, and improve operational safety for their field engineers The problem of automated dynamic grid mapping is not solved by wireless Smart Meters. The consensus among utilities is that the volatility of the LNM is such that using field engineers to measure and monitor changing attributes of the grid map is generally not a cost effective or workable solution.

Utilities habitually oversupply the line voltage to consumers to ensure that fluctuations in load, power losses in home wiring, etc. do not result in some consumers' service falling below 110 VAC effective at individual outlets inside the building, which is generally the optimum for home appliances and the like. The goal of a well-instrumented fine-grained conservation voltage regulation system might be to reduce the typical effective voltage at a single-phase meter to 114 VAC as measured from one leg of the typical 240 VAC service to neutral in the United States.

Cost constraints also dictate that placing SCADA or other instrumentation at every medium-voltage field asset is impractical. The "touch points" on the distribution grid are, for better or worse, largely the meters at the edge and the instrumentation in the substations. This dictates that techniques for power line communication be revisited, because signals traveling on the power line can be used both to infer and to report grid mapping information not detectable by means of wireless AMI. The ubiquitous presence of wireless AMI for reporting meter data can be considered as a benefit in the search for effective grid-mapping technology, in that it frees the limited data-bearing capacity of low-frequency on-grid transmission methods to support grid mapping systems instead. It is, however, desirable to identify a transmission method that is low cost at the edge and at other points within the electrical distribution system, coexists with the AMR or AMI, and does not trigger any of the above-noted pitfalls of on-grid transmission. Such pitfalls also include requirements for intermediate devices such as repeaters between the edge and the substation; unacceptable flicker; RF interference; impulse noise; etc. Finally, the transmission must require very little power, because the energy expended driving the transmitters reduces any financial benefits obtained.

Finally, the schematic topology of the grid is subject to change without notice or recordation. Therefore, the source of a signal may not be easily discernable. Consequently, it would be desirable to have a reasonably quick, reasonably low-cost solution to continuously, periodically or sporadically determine changes in the schematic topology of a grid and/or to ascertain the schematic location of a signal source. In addition, having established these schematic locations, there is a wealth of information available that can be analyzed to determine information about other aspects of the distribution grid such as, for example, segments connecting different elements of the grid.

In data communications, it is possible to have dedicated media between communicating devices. In the context of the present invention, two or more devices share a particular communication medium. This arrangement is referred to as "Multiple Access." That is, Multiple Access means that more than one transmitter can use the same transmission channel without the signal from one transmitter destructively interfering with the signal of another transmitter. It will be understood, for present purposes that transmission and reception facilities may be included within a single device.

Ideally, power line communication transmission must require very little power, because the energy expended driving the transmitters reduces the energy conservation benefits obtained. Some PLC methods have adapted radio modulation techniques, e.g., DPSK, and channel access methods, e.g., TDMA, to the medium of the electrical distribution grid. In TDMA, the channel is divided cyclically over time, with each transmitter sharing the channel assigned a specific time slot in the cycle where that transmitter uniquely has permission to transmit. TDMA requires that all the transmitters have system clocks which are synchronized with one another within a close enough tolerance that one channel accessor does not overlap its transmission with that of another channel accessor. Generally, the transmitter is not aware of other transmitters and other transmissions on the channel; the transmitter is only aware of the transmission that it provides. Thus, in implementation it happens that two transmitters transmitting on a same time slot causing a conflict in the respective transmissions from the two transmitters. Therefore, it would be desirable to have a reasonably quick, reasonably low-cost solution to resolve the conflict.

In an approach, the DTs transmit information from the associated meter to the substation receiver via a feeder and phase (feeder phase).

In systems implementing time slot messaging, there is an established period for the length of all time slots combined. In some systems, the period can be dynamic and can be changed during operation, which would require notifying and adjusting all of the elements on the system from the old period to the new period. In many systems, the combined time slot period is 24 hours. The length of a time slot is also established; it many systems, the length of a time slot can also be dynamically changed. In an approach, each transmission channel has a combined time period which can be logically segmented into time frames, and in turn, each time frame can be further logically segmented into individual time slots.

In accordance with TDMA and other multi access communications, transmitting devices are assigned one or more unique time slots to reduce the possibility of two (or more) transmitting devices transmitting signals at substantially the same time. In an aspect of the invention, the Computing Platform, or another higher level computer system that works with the Computing Platform, assigns time slots for each DT that is downstream of the distribution substation. Thus, each DT within a given domain has a unique time slot, or slots, for transmitting information to the computing platform. Therefore, when the computing platform receives a signal during a particular time slot in a particular domain, the computing platform can determine, with a high degree of certainty, which DT sent the signal.

A DT typically includes circuits for the appropriate communications necessary, (e.g., AMI, PLC, Cellular, and other), data collections circuits, and a non-volatile memory in addition to data processing abilities. A GPS signal or NTP time base may be used for synchronizing the DTs in addition to providing means to associate the logical network model with the physical network model and/or for synchronizing transmissions on a slotted channel so as not to collide with transmissions from other DTs.

When a DT becomes operational, the DT is provisioned, thereby it generally obtains the network system time if available, for example by querying the AMI logic in the Smart Meter, and formats, encodes, and transmits a provisioning request on an Edge-to-Substation channel reserved for provisioning requests and alerts. When a Substation Receiver detects the provisioning request, it may cause a provisioning response to be sent, either via the AMI, or via an available on-grid or wireless Substation-to-Edge channel. In a preferred electrical distribution system, once a DT is operational on a grid it is provisioned with information—the DT requests from the computer platform operational information. In response, the computer platform provides the DT with operational information, including, but not limited to, information describing the type of information the DT will transmit and one or more slot assignments.

Once a DT is assigned a slot assignment, and if appropriate, a channel, it will always transmit during its slot assignment on that channel, until either the DT receives some further instructions from the computer platform or an error occurs. In an embodiment, each domain generally employs one transmission frequency channel, but the domain may employ a plurality of channels, depending on the domain's configuration. As there may be a limited number of channels available for use, a domains may be using one or more of the same channels as another domain(s) in the system.

As noted above, the present invention provides for the communication of data signals across power transmission media. Such communications can be deployed across any of the system domains described above. Most typically, however, the subject communications will take place across various Substation Domains. Accordingly, for exemplary purposes, the present discussion will deal primarily with substation domain communications.

A method implemented by the DTs and the Substation Receiver provides for channelizing and modulating current signals transmitted from the at least one DT in the service area of an electrical distribution substation such that the signals are received at the Substation Receiver and the Substation Receiver is able to infer the electrical phase of the specific feeder upon which the signal was transmitted. The signal is transmitted on a broad band of the frequency spectrum called a channel, but the frequency bands of channels are selected so that the frequency is lower than the low-pass threshold of the service transformer that powers the Edge Transmitter. The method requires little power to inject the signal, so that the signals as modulated do not radiate energy in the RF spectrum or cause flicker or hum on devices in proximity to the transmissions or exhibit any of the other undesirable characteristics of prior art methods of on-grid messaging. The method works on all grid topologies through the use of domains, and can support a sufficient number of DTs per substation transformer such that even the largest substations can be fully covered. Consequently, the system is fully scalable.

In an embodiment, when the Substation Receiver has completely processed a transmission, it packages the decoded transmission together with any additional information about the message inferred by the receiver logic, such as the phase and feeder on which the message was transmitted, the channel on which the message was transmitted, and an indication of the parameters of the modulation method used for that transmission. The Substation Receiver forwards the entire message package to the substation Computing Platform using a normal TCP/IP-based protocol such as HTTP.

As noted above, electrical distribution grids are highly subject to dynamic changes, planned and unplanned. Circuits of the distribution grid can be changed, manually, semi-automatically, or automatically. For example, a lineman may cause a transformer to be moved from one side of a street to the other side of the street, and therefore may affect which DTs the transformer is connected to. Re-closers can be programmed to alter circuits in a distribution grid to compensate for short term power loss. These changes can be for various lengths of time usually dependent on the cause of the change. For example, a change caused by a re-closer due to short term power loss is generally a short term change. A change by moving a transformer is likely to be a long term change.

The complexity of a change in the distribution grid can be complicated in that accurate records are generally not maintained by the person or entity causing the change. For example, the lineman may not always accurately record and report the change of the transformer from one circuit to another. Thus, the associated computing platform is not aware of the circuit to which the transformer is connected. Furthermore, a circuit (or portion thereof) may be moved from one domain to another domain. If a DT associated with the changed transformer has moved from one domain to a second domain, then the DT may be transmitting on the same time slot as another DT previously present on the second domain. This will result in a conflict. In a distribution grid, as should be apparent with respect to FIG. 2, it is possible to switch one subordinate circuit of one feeder/phase of a domain to another feeder/phase of a different domain. Thus, domains that have previously operated independently are now at least partially joined. Consequently DT's that have been moved and are now on this new domain may be transmitting at the same time and on the same channel as other DTs that were already present on the resultant domain. This may result of a plurality of conflicts.

In another aspect, the operation of a device on a circuit may dynamically change. For example, a DT relies on an internal timing mechanism to determine when to transmit its signal. The DT's timing mechanism might drift, or some other circuit problem that affects the DT's timing, causing the DT to transmit its information out of sync with respect to the rest of the system or domain. When the transmission from this DT is out of sync, then the transmission is likely to at least partially overlap a time slot with another transmission that is in sync causing a conflict between the two signals.

In yet another aspect, in many existing electrical distribution systems, and those that are being planned and built, there are DTs spread out over a distribution grid. The DTs, although capable of both receiving and transmitting signals, are designed to predominately provide outbound communications, e.g., to the concentrator, a computer system at the distribution substation. The DTs are typically "dumb" devices with limited awareness of the context in which they are operating. For example, a DT is generally not aware of any other DT transmitting a signal. Thus, when a DT is transmitting its signal, the DT is not aware that it might be transmitting at least partially on top of a transmission from another DT.

The provisioning scheme (provisioning of a newly installed DT) anticipates and minimizes the problem of crosstalk, and provides means for logic on the Substation Receivers, the substation Computing Platforms, and the Concentrator, to hierarchically process the messages received from each DT. This information can be used to infer the state of various devices on the grid, such as switches, reclosers, and/or failures in the power lines. Other properties of the transmission are determined dynamically by firmware and instrumentation on the DT. For example, the power used when transmitting may be related to the impedance of the line as measured immediately prior to transmitting.

In an aspect, stored programs at each of the at least one DT integrate the Edge-to-Substation GLA network with adjacent networks, such as the AMI, as well as with the native intelligence of the Smart Meter platforms themselves. The DT can poll the local native Smart Meter intelligence to obtain local data such as current, voltage, and phase angle. The DT then derives results from the collected data points.

The DT stores, compresses, and/or processes the gathered data according to the policies and application algorithms contained within the stored programs until the operable policy dictates that the gathered data and/or derived results of the gathered data may be transmitted to the Substation Receiver. These policy-based "derived results" can be thought as "apps" for DTs and can be altered or changed from time to time.

When slotted channels and/or time-scheduled transmission policies are used, the DT may require a method of synchronizing its system clock to a known tolerance with other DTs in the same service area. In an embodiment, each DT may poll the local meter or AMI network to obtain the AMI network time, which the DT uses to determine when scheduled transmissions must occur, and to obtain data blocks received via the AMI, which are intended for the Grid Location Aware intelligence on the DT. Such data blocks may include firmware updates and changes in network policy or provisioning that will affect the subsequent behavior of the DT. Additionally, in another aspect, DTs may synchronize based on a wireless broadcast signal. In yet another aspect, if no synchronization method is available, channel access may not be based on time slots at all. This reduces the data-bearing capability of the network but does not impact the ability of the system to provide data. In some embodiments, DTs may contain a Global Positioning System (GPS) receiver. This GPS signal may be used for synchronizing the DTs in addition to providing means to associate the logical network model with the physical network model.

In one embodiment, the Computing Platforms and the Concentrator maintain two master data tables that can be initially extracted from the utility's PNM and/or LNM, or which can be entirely accumulated from reports from the DTs. These data tables are the Inventory, which is a table of all the DTs that have been detected, and the Grid Map, which is a schematic representation of the grid's topology and state, similar to an LNM.

The Grid Map and Inventory at substation Computing Platforms may be partial, representing only the portion of the grid accessible to the substation at least at certain times. The Grid Map and Inventory at the Concentrator generally represent the entire utility service area, although gaps in the Grid Map may exist if instrumentation of the service area with DTs is incomplete. In an embodiment, when the Computing Platform at a substation receives any message from a DT, it compares the data in the message and the message enhancements inferred by the Substation Receiver with the data in the Inventory and Grid Map. The logic and policy on the Computing Platform are used to determine if the local copy of the Grid Map and Inventory need to be updated, and whether the update must be sent on to the Concentrator to update the master Grid Map and Inventory. If the policy in effect at the Computing Platform so dictates, the data collected from the edge is also forwarded to the Concentrator. The Concentrator in turn carries out policies dictating which events and scheduled reports must be published out to other data center applications.

Further to the discussion of channelization, in an aspect, FIG. 5 depicts a slot structure for a portion of a period. The slot structure depicts one frame 462 having a first and second channel 452, where each channel has six time slots 452. In an embodiment five of the time slots 452 of each channel, i.e., Time Slots 1-5, are payload slots or synchronous slots. The sixth slot of each channel is an async slot, i.e., Time Slot 6. The sync time slots are generally used for scheduled transmissions, e.g., slot transmissions. The async time slot is used for other unscheduled transmissions. An async time slot is used, for example, when a DT first starts up on a system (initial provisioning) and sends a message, using on-grid communications, to the FIM or other appropriate element(s) requesting a time slot assignment.

The time slots are further described with respect to having a data burst portion 456 and an inter-burst interval 458. In an exemplary approach, the data burst portion 456 is approximately 5 seconds in length and the inter-burst interval is around 1 second, although different time allocations can be implemented, as is known. Channels 1 and 2 are depicted as having scheduled organization. Channel 1 is depicted has having designated DT HR101 for Time Slot 1, DT HR102 for Time Slot 2, DT HR103 for Time Slot 3, DT HR104 for Time Slot 4, DT HR105 for Time Slot 5, and async for Time Slot 6. Channel 2 is depicted has having designated DT HR201 for Time Slot 1, DT HR202 for Time Slot 2, DT HR203 for Time Slot 3, DT HR204 for Time Slot 4, DT HR205 for Time Slot 5, and async for Time Slot 6. Although depicted with more than one channel, a system may employ only a single channel.

FIG. 6 depicts a burst profile of a time slot of FIG. 5 in greater detail. As depicted, the burst has a designed burst time, e.g., around 5 seconds, and a burst direction, e.g., beginning with the right side burst and ending with the left side of the burst. In an approach, the burst profile can be broken into two component parts, e.g., a header and a tail. The header 472 of the data burst typically includes system information. For example the head, or header, provides preamble data used by the computing system for Grid Location Awareness and demodulator synchronization. In an aspect, the header includes a characterizing signal that is used for detection by the FIM. The tail 474 of the data burst provides payload data, e.g., address data, control data, CRC data, voltage data, and/or other types of data.

The number and organization of channels described is by example only. On some substations, only one reliable channel may be available. Regardless of the number of channels, a plurality of time slots may be reserved for alerting (e.g., async messages), while other time slots are scheduled. In one embodiment, a single channel is sufficient to permit 12,000 DTs to transmit once daily. It should be obvious to one skilled in the art, that the number of DTs, the periodicity of their scheduled transmissions, the number of available asynch slots, the size of the scheduled and asynch slots, and the number of required channels are all interrelated.

In an aspect, the computer system can dynamically change what data a DT is providing. Moreover, if the amount of information being sent in a single transmission by a DT is decreased, then the periodicity can be increased. This is helpful in certain applications, such as detection of technical losses or non-technical losses (theft) or in rapidly detecting storm damage.

Currently, a power company becomes aware of power loss based upon customers calling the power company the company to complain. The power company correlates the phone calls to a location(s) and sends a repair crew(s) to the identified location(s). Should a significant number of customers call, then the power company would likely investigate a higher level cause of the power outage, e.g., phase, feeder or substation failure. Conversely, a power company is generally not informed when customers' power is restored. As a result, a power company typically resorts to sending out workers to drive around and observe. Thus, a computer system using DTs in storm mode may not necessarily be concerned about the voltage level or other data typically collected and stored at the DT, only that the DT is transmitting, which would indicate that the DT still has power. This smaller amount of data translates to a smaller scheduled time slot, which in turn results in more slots during a period, and thus faster reporting by the DTs. If one or more DTs are not received by the computer system, then something has failed—presumably due to weather. The presence and/or lack of transmissions by one or more DTs can be used for circuit failure inference. For example, the computer system knows that time slot 222, slot 235, and slot 987 correspond to DTs on same circuit, and if the computer system is not receiving any information during those respective time slots from those devices, then the computer system can infer the entire circuit has failed. Quickly identifying circuit failure can lead to quicker system analysis and correction.

Once a DT has been installed and enabled for operation, including the process of syncing its operations with the computer system, the DT sends a message to the FIM which is forwarded to the concentrator system, or more specifically the network and data management component. The network and data management component determines a slot assignment for the DT that requested a slot assignment, records that slot assignment in a database, and forwards, using a downstream radio link or other appropriate method, that slot assignment downstream to the DT. When the DT receives the slot assignment, it stores the slot assignment information in non-volatile memory and sends an acknowledgement signal back to the network and data management component, preferably through a upstream radio link. In the situation where the DT is schedule to have multiple transmissions per period, e.g., to transmit on more than one slot, then a similar process is employed to request a (another) slot time and frame—requesting, receiving and acknowledging—until all of the number of required slots have slot assignments.

A flowchart depicting the logical flow of the DT start up and slot assignment are depicted in FIG. 7.

In segment S200, the process starts. Process flow continues to segment S202.

In segment S202, a DT begins to power up. In an approach, the DT sends a message using an async channel of a Power grid communication system requesting slot timing information. Process flow continues to segment S204.

In segment S204, the DT acquires slot timing information. Process flow continues to segment S206.

In segment S206, the DT checks to see if the slot assignment information is stored in its persistent memory. If the slot assignment information is stored in persistent memory, then process flow continues to segment S220. If the slot assignment information is not stored in persistent memory, then process flow continues to segment S208.

In segment S208, the DT transmits, preferably using on-grid communication mechanism, a provision request to an upstream processing system, e.g., the network and data management component by way of a substation receiver, preferably using an Async payload slot. Process flow continues to segment S210.

In segment S210, the DT starts a fixed retransmission timer plus random retransmission timer. Process flow continues to segment S212.

In segment S212, the DT checks whether a slot assignment has been received, preferably through an RF link. If a slot assignment has been received, then process flow continues to segment S216. If a slot assignment has not been received, then process flow continues to segment S214.

In segment S214, the DT checks to see if there is a timeout due to a fixed plus random time. If there is a timeout, process flow continues to segment S208. If there is not a timeout, process flow continues to segment S212.

In segment S216, the DT stores the slot assignment in its persistent memory. Process flow continues to segment S218.

In segment S218, the DT sends a signal acknowledging the receipt of the provision request, preferably by way of an upstream radio. Process flow continues to segment S220.

In segment S220, the Routine exits and the process ends.

Thus, at the end of the process a DT has requested and received its provision request for a slot assignment and has stored that information in its persistent memory. In a DT designated to have more than one slot assignment, the process above is repeated for each slot assignment required.

In an approach of the invention, the data and network management component is tasked with managing the DTs, including providing, directly or indirectly, the provisioning information to each DT. In a preferred approach, DTs are provided with one or more slot assignment(s), e.g., Scheduled Payload Slot(s) assignment(s), for a given Frame and Slot on a pseudo-random basis. The first slot assignment is random, with the seed for the random number generator provided by the time of receipt of the Provisioning Request from the DT. After comparing the randomly generated first slot assignment with the data and network management component to see if the computed slot is already assigned, the process is repeated until an available slot is determined. In a preferred approach, multiple slot assignments are provided so as to schedule the slot assignments more or less equally throughout the time slot period, e.g., 24 hours, although the specific slot is still pseudo randomly generated. This pseudo random slot assignment methodology reduces the likelihood that when two circuits are folded on top of one another without a priori knowledge, the number of conflict in timing assignment is reduced and, in turn, the need and the required time for resolving the conflict is likewise reduced. In one embodiment, the data and network management component receives provision requests from the DT via on-grid communications. It provides a slot assignment via the upstream and downstream RF link, although any appropriate communication systems can be employed for the slot assignment message.

FIG. 8 is a flowchart depicting an exemplary logical flow of a methodology for assigning a slot for a DT that has provided a provision request.

In segment S500, the provision process begins. Process flow continues to segment S502.

In segment S502, a provision request from a DT is received by the data and network management component. This request is generally received by the data and network management component by way of the substation receiver, which in turn, received the request by way of on-grid communications. Process flow continues to segment S504.

In segment S504, the data and network management component clears—resets—the Round_Trip_Timer and the Background_Task_Timer. Process flow continues to segment S506.

In segment S506, the data and network management component, e.g., the VirtuGrid (VG), looks up, e.g., Num_Slots_DT, the DT to determine how slots, e.g., how many slots, are to be assigned to the DT. Process flow continues to segment S508.

In segment S508, an initial slot assignment, e.g., Slot_Assigned, is determined based on randomizing function of the time that the provision request was received, the maximum number of slots available, the substation domain, and the substation transfer domain and then the result normalized against the range of slot assignments, e.g., the slot is a random function of $f_{RAND1}$ (Prov_Req_Time, Max_Slots, SD, ST), where SD is the substation domain and ST is the substation transformer domain. Process flow continues to segment S510.

In segment S510, the slot assignment, e.g., Slot_Assigned, is reserved for the DT, e.g., in the VG. Process flow continues to segment S512.

In segment S512, the data and network management component checks to see if the initial slot assignment is available. If the slot assignment is available then the process flow continues to segment S516. If the slot assignment is not available, then the process continues to segment S514.

In segment S514, the slot assignment for the DT is released in the data and network management component. Process flow continues to segment S508.

In segment S516, the slot assignment is provided to the DT, preferably using an RF link. Process flow continues to segment S518.

In segment S518, the process waits until the system clock, or other timing mechanism reaches a predefined value for the Round_Trip clock. Process flow continues to segment S520.

In segment S520 data and network management component checks to see if has received an provision acknowledgement signal from the DT. If the acknowledgement signal has been received, then process flow continues to segment S522. If the acknowledgement signal has not been received from the DT, then the process flow continues to segment S526.

In segment S522, the data and network management component confirms in its database that the slot has been assigned to the DT. Process flow continues to segment S524.

In segment S524, the data and network management component checks to see if the number of slots requested, e.g., Num_Slots_DT, for the DT is greater than one. If the number is greater than one, then the process flow continues to S532 to assign additional slots to the DT. If the number not greater than one, then process flow continues to segment S534.

In segment S526, the process waits until the system clock or other timing mechanism, reaches a predefined value for the Background_Task. Process flow continues to segment S528.

In segment S528, data and network management component checks to see if there has been a new provision request received from the same DT. If there has been a new provision request received, then the process flow continues to segment S530. If there has not been a new provision request received then, the process flow continues to segment S516.

In segment S530, data and network management component releases in its database the slot assigned for the DT. Process flow continues to segment S504.

In segment S532, the system repeats this slot assignment methodology, or another slot assignment methodology, for example as described below with referenced to FIG. 9, for each slot assignment needed greater than one. When all of the slot assignments have been processed, then process flow continues to segment S534.

In segment S534, the process exits and ends.

Thus, at the end of the process, the data and network management component has generated and provided a slot assignment(s) for a DT and received acknowledgement from the DT that it has received the slot assignment(s).

If multiple slots are to be assigned for a DT, then FIG. 9 is a flowchart depicting an exemplary logical flow of a methodology for assigning a plurality of slots for a DT that has provided a provision request.

In segment S602, the process to assign multiple slots to a DT starts. Process flow continues to segment S604.

In segment S604, a slot index is determined as the Max slots available divided by the number of slot assignments required by this DT, e.g., Slot_Index=Max_Slots/Num_Slots_DT. Process flow continues to segment S606.

In segment S606, the loop count is set equal to one, e.g., Loop_Count=1, and N_Slot is set equal to the slot previously assigned to the DT and stored in the data and network management component, e.g., N_Slot=Slot_Assigned. Process flow continues to segment S608.

In segment S608, the (proposed) new slot assignment for the DT is set to the previously assigned slot plus an offset, e.g., N_Slot is set equal to N_Slot plus the Slot_Index. Process flow continues to segment S610.

In segment S610, the systems checks whether the number of slots is beyond the boundary of the allowable slot assignments, e.g., is N_Slot greater than the maximum number of a slot that can be assigned or N_Slot>Max_Slots? If N_Slot is greater, then process continues to segment S612. If N_Slot is not greater, then process flow continues to segment S614.

In segment S612, N_slot is set equal to N_slot minus the maximum number of slots, e.g., N_Slot=N_Slot−Max_Slots. Process flow continues to segment S614.

In segment S614, a proposed slot assignment is determined by setting the proposed slot to a random function of provision request time, the N_slot, and the window size, e.g., Slot=$f_{RAND2}$ (Prov_Req_Time, N_Slot, Window_Size). In an approach, the window size is the region of uncertainty around the next ideal slot assignment. Process flow continues to segment S616.

In segment S616, data and network management component compares the proposed slot to the slot assignment database to determine if the proposed slot is available. If the proposed slot is available, then process flow continues to segment S624. If the proposed slot is not available, the process continues to S614

In segment S624, the proposed slot assignment, e.g., Slot_Assigned, is sent to the DT, preferably by way of a RF link. Process flow continues to segment S622.

In segment S622, the data and network management component confirms in its database the slot assigned, e.g., Slot_Assigned, for the DT. Process flow continues to segment S620.

In segment S620, the loop count is incremented. Process flow continues to segment S618.

In segment S618, the loop count is compared to the number of slots needed for the DT, e.g., Loop_Count<Num_Slots_DT?. If the loop count is less than the number of slots needed, then the process flow continues to segment S608. If the loop count is not less than the number of slots needed then the process flow continues to segment S626.

In segment S626, the system waits for a system clock or other timing mechanism to reach a predefined time, e.g., Background_Task seconds. Process flow continues to segment S628.

In segment S628, data and network management component checks to see if acknowledgements, e.g., Provision_Ask, have been received for all of slots assigned to the DT. If all of the acknowledgement have been received then, process flow continues to S632. If not all of the acknowledgements have been received, then process flow continues to segment S630.

In segment S630, the data and network management component determines which slot assignment acknowledgement has not been received and provides the slot assignment(s) to the DT. Process flow continues to segment S626.

In segment S632, the routine exits and the process ends.

Thus, at the end of the process, multiple slots assignments have been created for a DT, sent to the DT, and acknowledged by the DT.

Once an electrical grid system is operational and the operating DTs have been provisioned, there may come a time where there is a conflict in an assigned time slot between at least two DTs. Collisions of transmitted information from DTs, being either partial or totally overlapping transmissions ideally should be prevented because they can destructively interfere with the data contained in the transmissions.

A slot conflict can occur when two or more DTs use the same Scheduled Payload Slot, e.g., a slot assignment, at substantially the same time. The slot conflict is typically caused by either an Unknown Event or a Rogue Transmitter. An Unknown Event is typically caused when the computer system makes or has made multiple assignments to the same scheduled payload slot. This typically occurs when the network and data management component assigns a particular payload slot to a first DT that located in a first domain of the distribution grid and to a second DT. At the time the network and data management component makes that assignment, the second DT is understood by the network and data management component to be in a domain other than the first domain. However, if the second DT moved into the first domain either at some time before, unbeknownst to the network and data management component, the slot assignments were made to the first DT or after the network and data management component made the assignment. Under such circumstances, the possibility for a slot conflict is created. This movement of a DT from one domain to another without the knowledge of the network and data management component typically occurs during unplanned changes in the distribution grid circuit paths. Thus, for example, when a lineman goes out to fix a line problem as part of an unplanned change due to weather or an accident and the lineman switches a circuit from a domain to another domain without appropriately reporting the change, or the change was reported, but the data was not properly entered in the computer system, then in either case, the network and data management component was not properly updated. Presumably, when planned changes in the distribution grid circuit paths occur, the network and data management component is appropriately updated with the changes that affect the grid layout, although the invention does not need such updating to function appropriately in every embodiment.

A slot conflict can also be caused by a rogue transmitter of a DT in the electric distribution grid. A DT includes internal circuitry that tracks master timing of the slot transmissions. As is known, time slotted transmission systems typically employ a universal timing synchronization signal that is periodically transmitted in a system to sync all of the units that send/receive on the system, generally referred to as a Master Sync. It is conceivable that a situation can arise where a DT's internal timing drifts off, and is no longer synchronized with the master timing. Lack of synchronization is typically caused by failure to update timing via NTP or Loss of GPS timing signal. When this out of sync event occurs, the DT transmits its signal(s) at the appropriate time slot according to its internal timing however this time slot is not the appropriate time slot with respect to the master timing schedule. A Rogue Transmitter can "walk" its timing so as to create a single slot conflict, or span across two slots and create an adjacent slots conflict. DTs must obtain master timing on a periodic basis or are automatically squelched. If the signal is squelched, then the Rogue Transmitter's signal ceases to transmit, and the conflict likewise ceases to exist.

A slot conflict is detected by examining the candidate signal energy that is received by the FIM during a time slot. This can be candidate signal energy over time or it can be an absence of candidate signal energy. Energy over time is the candidate signal energy that is received and is across substantially all of the time slot, partially across the time slot, and partially across adjacent time slots.

Energy Across the Slot is when the FIM detects candidate signal energy across the slot, i.e., of a duration approximately equivalent to a DT transmission, then there is either a Slot Conflict or the presence of a large amount of impulse noise. Energy Partially Across the Slot is when the FIM detects candidate signal energy across a portion the slot, i.e., of a duration less than that of a DT transmission, then there is either a Rogue Transmitter Slot Conflict or the presence of some amount of impulse noise. Energy Partially Across Adjacent Slots is when the FIM detects candidate signal energy across a portion of two adjacent slots, then there is either a Rogue Transmitter Slot Conflict or the presence of some amount of impulse noise.

If candidate signal energy is substantially not detected at the FIM for an Assigned Slot, then no recognizable signal is received at that time slot. This lack of candidate signal energy suggests that a DT failed to transmit, the circuit powering the DT has failed, a condition on the Grid has attenuated the DT's transmit signal sufficiently to not be detected by the FIM, or the DT is transmitting at a time other than the assigned slot.

In an approach of the invention, once a slot conflict has been identified, the network and data management component initiates, at the earliest opportunity, a process for resolving the slot conflict. An exemplary method for resolving a time slot conflict generally depends on implied cause of the conflict, which is based on how the conflict was detected. If the conflict was detected based on Energy across a slot, then the network and data management component determines the DT that is the DT of record (i.e., the DT that the network and data management component believes should be transmitting at that time slot according to its database of assigned time slots) for that time slot, then the network and data management component determines a new assignable (not currently taken) payload slot for that DT and provides that payload slot information to the DT.

If a conflict is determined based on Energy Partially Across the Slot, then candidate signal energy received at the time slot is examined, e.g., by the FIM, to determine if any information can be extracted. If a valid GLA signal—the header of the burst data—is extracted, then the network and data management component does not issue a new slot assignment.

If the FIM fails to detect a valid GLA signal, a new Assignable Payload Slot is given to the DT of Record (i.e., the DT that the network and data management component believes should be transmitting in this slot).

If the FIM detects Energy Partially Across Adjacent Slots, then the network and data management component will follow the process described above with respect to Energy partially across the slot.

FIG. 10 is a flowchart depicting a logical flow of a methodology for the decision process of whether to assign a new payload slot to a DT in the event that a network and data management component determines that there is a slot conflict.

In segment S700, the new slot assignment decision process begins. Process flow continues to segment S702.

In segment S702, the FIM has detected candidate signal energy has been detected during a valid slot time. Process flow continues to segment S704.

In segment S704, the FIM examines the duration of candidate signal energy detected in the time slot and compares it to an established burst time, e.g., Energy_Duration=Burst_Time?. If they are not approximately the same length of time, then burst length is likely invalid and the likely cause is noise. However, there also exists the possibility of a rogue transmitter causing the conflict, but not likely; thus, process flow continues to segment S710. If they are approximately the same length of time then process flow continues to segment S706.

In segment S706, the FIM examines the candidate signal energy received to determine whether a valid GLA signal has been detected. If a valid GLA signal has been detected, then the transmitted signal is likely a normal signal, where the conflict in transmission may be due to late noise or a rogue transmitter, but not likely; process flow continues to segment S710. If a valid GLA has not been received then this indicates that a collision is likely, which could have been caused by noise or by a rogue transmitter, but not likely; process flow continues to segment S708.

In segment S708, a new assigned slot(s) is provided to the DT of record. Process flow continues to segment S710.

In segment S710, the routine exits and the process ends.

Thus, at the end of the process, if the network and data management component determines that a collision has occurred, then the DT of record is provided a new assigned time slot. The network and data management component stores the new assignment slot along with the DT within its system and the DT stores the assignment slot in its system.

When a conflict is determined to exist, in a preferred approach, the computer system may employ one of several different approaches to reassigning slot assignments: in a situation with a DT having a single slot assignment, the computer system would typically use a Single Slot Reassignment approach; in a situation with a DT having a multiple slot reassignments, the computer system would typically use a Multi-Slot Reassignment approach; and in the situation where there is a conflicting DT, the computer system would typically employ a conflicting DT resolution approach.

In a preferred Single Slot Reassignment approach of the invention, also referred to as a DT with Single Scheduled Payload Slot, once a slot conflict has been identified, the conflict should be ideally resolved at the earliest reasonable time so that there will be a reduction or elimination of the likelihood that current and/or new information transmitted by a DT(s) in conflict will be lost, overwritten, or otherwise being inaccessible. However, the process should ensure that the new assigned time slot does not occur too close in time to the current, (e.g., old) assigned time slot as the system must account for some delays in providing the information to the DT and time for the DT to function. One part of the delay is for the system to determine what the new slot assignment should be for the DT of record. A second part of the delay is minimum amount of time needed to communicate the new slot assignment with the DT of record; this part of the delay would take into consideration, the traffic on the RF link used to transmit the new slot assignment. A third part of the delay, although typically insignificant, is a delay for the DT to store the new assignment information and prepare to transmit the information during the new time slot. See, for example, FIG. 11, which depicts a slot reassignment.

As depicted in FIG. 11, in a Frame 1152, a computer system detects a slot conflict in Frame 1, slot 3, denoted by an "X", e.g., time slot 1162. Shortly thereafter, the computer system determines a new slot assignment for the DT. There is a transmission delay—it isn't until the time corresponding to Frame 3, slot 3 that the appropriate DT of record receives the slot assignment information, e.g., at time slot 1164. The new slot assignment is Frame 4, Slot 5, e.g., time slot 1166. Assuming that each slot is six seconds, the DT has approximately five time slots or thirty (30) seconds to prepare to transmit the information that it is supposed to transmit. Thus, once the conflict was detected, a DT associated with that conflict had its slot assignment re-assigned and provided with its new slot assignment within a minute. Although this might be a best case scenario, the resubmission of this DTs' information was transmitted within approximately 18 time slots or 108 seconds.

In a preferred approach of the invention, upon Slot Conflict Detection, the network and data management component should initiate a process to reassign the slot assignment for the conflicted DT. First, the network and data management component identifies the conflicted DT. Using its database, the network and data management component looks up what DT has been assigned to the slot with a conflict, which may be referred to as the "DT of Record." The network and data management component seeks to give the DT of Record a pseudo random slot assignment within the range of a minimum offset, i.e., "No Assignment" period or "No Assignment Window" 1154, and a maximum offset, i.e., Max Recovery.

A "No Assignment" period allows sufficient time for the DT to receive the assignment message via the downstream radio link. The minimum No Assignment period is typically set based upon the type of downstream radio rink type, the outbound message queue time, and the upstream radio link type. In an approach, the no assignment period will be measured in seconds, but the system would typically avoid a No Assignment period being less than one Frame time or thirty (36) seconds for practical purposes. As such, a new slot assignment cannot within the time period covered by the No Assignment period.

The computer system would also employ a maximum "Recovery" period, which is the longest period of time before which a DT will be provided a slot assignment. Typically the Max Recovery would be set to 24 hours, but can be set much shorter if the information from a particular DT is considered high value and thus sought to have the DT's information transmitted sooner than later, for example, approximately 12 hours, then the Max Recovery off would be set to 43,200 second (=twelve (12) hours).

In another aspect, the computer system also employs a Max setoff, which is the maximum value, typically expressed in seconds, between the DT's slot assignment having a conflict and the newly proposed slot assignment for the DT. Again, for a high value DT where it is sought to have the information from the DT before too long a period, for example, approximately 12 hours, then the Max Set off would be set to 43,200 second (=twelve (12) hours).

After receiving the new assigned slot, the DT acknowledges the slot assignment over the upstream radio link. The DT stores the new slot assignment, and updates its circuitry appropriately to transmit at the new slot assignment.

FIG. 12 is a flowchart depicting a logical flow of a methodology for a single slot reassignment according to a preferred approach of the invention. As described above, when the computer system determines that a DT having a single slot assignment has a conflict and needs to be reassigned, then the computer system implements the following approach:

In segment S1102, the single slot reassignment process begins. Process flow continues to segment S1102.

In segment S1104, N_Slot, is set approximately equal to the current slot of the DT in conflict plus an offset the value of the No Assignment window, e.g., No_Assign_Window. Process flow continues to segment S1106.

In segment S1106, the proposed slot assignment seed is compared to the maximum number of slots available, e.g., Max_Slots. If the proposed slot assignment number is greater than Max_Slots, then process flow continues to segment S1108. Otherwise, process flow continues to S1110.

In segment S1108, N_slot is set equal to N_slot minus the maximum number of slots, e.g., N_Slot=N_Slot−Max_Slots. Otherwise, process flow continues to S1110.

In segment S1110 the proposed slot assignment is set approximately equal to a random number generated based on the seeding of the date and time, the proposed assignment slot seed, and the window size (i.e., the region of uncertainty around the next slot assignment. It is a range +/− around the proposed slot assignment. This is typically set to the value 10, but can be set to any value). For example, Slot=$f_{RAND2}$ (Date_Time, N_Slot, Window_Size). Process flow continues to segment S1112.

In segment S1112, the network and data management component of the computer system checks its database to see whether the proposed assignment slot is available. If the proposed assignment slot is available, then process flow continues to segment S1114. Otherwise, process flow continues to S1110.

In segment S1114, the network and data management component records the proposed slot assignment, e.g., Slot_Assigned, for the DT in its database. Process flow continues to segment S1116.

In segment S1116, a loop counter (i.e., Loop_Count) is set to zero. Process flow continues to segment S1118.

In segment S1118, the loop counter is incremented by one. Process flow continues to segment S1120.

In segment S1120, the loop counter is compared to a defined number for the max number of attempts to communicate the new assigned slot to the DT, e.g., Loop_Count>Max_Retries? If the loop counter is greater than the Max number of retries, then process flow continues to S1128. Otherwise, process flow continues to segment S1122.

In Segment S1122, the computer systems send the proposed slot assignment, e.g., Slot_Assigned, to the DT, preferably via RF link. Process flow continues to segment S1124.

In segment S1124, the system waits for a defined amount of time, e.g., Round_Trip_Seconds. When the delay is over, process flow continues to segment S1126.

In segment S1126, the computer system checks to see if an acknowledgement has been received from the DT that the slot assignment, more specifically a slot reassignment, has been received from the DT, e.g., Slot_Reassign_Ack. If an acknowledgement has been received, then process flow continues to segment S1132. If not, the process flow continues to S1118.

In segment S1128, the computer system releases the proposed slot assignment which can be used by the system for future use. Process flow continues to segment S1130.

In segment S1130, the Routine exits and the process ends.

In segment S1132, the computer stores confirmation of the proposed slot assignment as the slot assignment for the DT. Process flow continues to segment S1130.

Thus, at the successful completion of the process the DT is provided with a new slot assignment, where the slot assignment should be far enough in the future that the DT will have time to transmit its data at the new slot assignment. If the process ends because it has tried too many times, then the DT is not reprogrammed at this time.

In a Reassignment approach for a DT with two or more Scheduled Payload Slots, also referred to as a Multi-Slot Reassignment, the computer system typically applies a combination of methods. In a preferred approach, a first slot reassignment is done according to DT of Record is given the first slot assignment using the procedure of "DT with Single Assignable Payload Slot" as discussed above with reference to FIG. 12. The remainder of slot assignments are provided generally using the procedure of "Initial DT Detection and Assignment" as discussed above with reference to FIGS. 7, 8 and 9 for the remaining assignment slots of the DT having a plurality of assignment slots.

FIG. 13 is a flowchart depicting a logical flow of a methodology for a multiple slot reassignment. As described above, when the computer system determines that a DT having a slot assignment has a conflict and needs to be reassigned, then the computer system implements the following in a preferred approach.

In segment S1200, the process starts. Process flow continues to segment S1202.

In segment S1202, the single slot reassignment process begins. Process flow continues to segment S1204.

In segment S1204, the proposed slot assignment N_Slot seed is set approximately equal to the current slot of the DT, e.g., DT_Slot, plus the value of an offset to account of delay, e.g., the No_Assign_Window. Process flow continues to segment S1206.

In segment S1206, the proposed slot assignment seed, e.g., N_Slot, is compared to the maximum number of slots available. If the proposed slot assignment number is greater than Max_Slots, then Process flow continues to segment S1208. Otherwise, process flow continues to S1210.

In segment S1208, the proposed assigned slot seed, e.g., N_Slot, is set equal to the proposed assigned slot seed minus Max_Slots e.g., N_Slot=N_Slot−Max_Slots. Process flow continues to segment S1210.

In segment S1210 the proposed slot assignment is set approximately equal to a random number generated by the date and time, the proposed assignment slot seed, and the window size. For example, Slot=$f_{RAND2}$ (Date_Time, N_Slot, Window_Size). Process flow continues to segment S1212.

In segment S1212, the network and data management component checks its database to see whether the proposed assignment slot is available. If the proposed assignment slot is available, then process flow continues to segment S1214. Otherwise, process flow continues to S1210.

In segment S1214, the network and data management component records the proposed slot assignment for the DT in its database. Process flow continues to segment S1216.

In segment S1216, a slot index is determined as the Max slots available divided by the number of slot assignments required by this DT e.g., Slot_Index=Max_Slots/NumSlots_DT. Process flow continues to segment S1218.

In segment S1218, the loop count is set equal to one and N_slot is set equal to the slot previously assigned to the DT and stored in the data and network management component, e.g., N_Slot=Slot_Assigned. Process flow continues to segment S1220.

In segment S1220, N_slot is set equal to N_slot plus the slot index, e.g., N_Slot=N_Slot+Slot_Index. Process flow continues to segment S1227.

In segment S1227, if N_Slot greater than the maximum number of slots that can be assigned, e.g., N_Slot>Max_Slots? If N_Slot is greater, then process continues to segment S1224. If N_Slot is not greater, then process flow continues to segment S1226.

In segment S1224, N_slot is set equal to N_slot minus the Max number of slots, e.g., e.g., N_Slot=N_Slot−Max_Slots. Process flow continues to segment S1226.

In segment S1226, slot is set equal to a random function of provision request time, the N_slot, and the window size. For example, Slot=$f_{RAND2}$ (Date_Time, N_Slot, Window_Size). Process flow continues to segment S1234.

In segment S1234, the data and network management component compares the slot to the slot assignment database to determine if slot is available. If the slot is available, then process flow continues to segment S1232. If the slot is not available, the process continues to S1226.

In segment, S1232, the data and network management component reserves the slot assignment, e.g., Slot_Assigned, for the DT in its database, e.g., the VG. Process continues to segment S1230.

In segment S1230, the loop count is incremented, e.g., Loop_Count=Loop_Count+1. Process flow continues to segment S1228.

In segment S1228, the loop count is compared to the number of slots need for the DT, e.g., Loop_Count<Num_Slots_DT. If the loop count is less than the number of slots needed, then the process flow continues to segment S1220. If the loop count is not less than the number of slots needed then the process flow continues to segment S1236.

In segment S1236, the Loop_Count is set to zero. Process flow continues to segment S1238.

In segment S1238, the Loop_Count is incremented by one, e.g., Loop_Count=Loop_Count+1. Process flow continues to segment S1240.

In segment S1240, the Loop_Count is compared to the maximum number of retries (Max_Retries). If Loop_Count is greater than the Max_Retries, e.g., Loop_Count>Max_Retries?, then the process flow continues to S1242. Otherwise the process flow continues to segment S1244.

In segment S1242, all of the proposed slot assignments, e.g., Slot_Assigned, for the DT are released. Process flow continues to segment S1252.

In segment S1244, all of the proposed slot assignments for the DT are sent to the DT, preferably via RF link. Process flow continues to segment S1246.

In segment S1246, the system waits for a system clock or other timing mechanism to reach a predefined time of Round_Trip seconds. Process flow continues to segment S1248.

In segment S1248, the data and network management component checks to see if acknowledgements have been received for all of slots assigned to the DT, e.g., Slot_Reassign_Ack received?. If all of the acknowledgements have been received then, process flow continues to S1250. If not all of the acknowledgements have been received, then process flow continues to segment S1238.

In segment S1250, the data and network management component confirms in its database all of slots assigned to the DT. Process flow continues to segment S1252

In segment S1252, the Routine exits and the process ends.

Thus, at the end of the process, multiple slots assignments have been created for a DT, sent to the DT, stored in and acknowledged by the DT and stored in the database of the computer system.

When a conflicting situation occurs and the DT of record has been subsequently reassigned to another slot, then typically the DT that caused the conflict with prior DT of record at an allotted time slot can generally be detected by the computer system. The computer system detects the conflicting DT when the conflicting DT transmits at the next allotted time slot, which, on a 24 hour period, will be approximately 24 hours after the last allotted time slot. The computer system can determine the DT's location on the grid based on its established techniques. See, for example, "System And Method For Inferring Schematic And Topological Properties Of An Electrical Distribution Grid", U.S. patent application Ser. No. 13/871,944 and "System And Methods For Inferring The Feeder And Phase Powering An On-Grid Transmitter" U.S. patent application Ser. No. 14/304,648, the contents of which are incorporated herein in their entirety.

Additionally, the computer system can determine an ID of the conflicting DT based on information that it transmits. In one aspect, the conflicting DT transmit identifying information for itself as part of a scheduled signal transmission, as the DT's identifying information is contained as part of the data burst (FIG. 6), which may be part of the header and/or the tail of the data burst. In another approach, the computer system sends a signal to the conflicting DT directing it to send its identifying information during its next scheduled transmission. A computer system may infer which DT is the conflicting DT if it reviews which DTs it has received a transmission from. If there is a DT having a missing transmission, then the computer system can infer that this is the conflicting DT and send an instruction to that DT to have it send its identifying information during its next schedule transmission. If the computer systems receives a DT's identifying information during the next time slot corresponding to the conflicting time slot, then that identifying information is presumed to be the conflicting DT. If the computer system finds that there are several DTs that do not seem to have transmitted a signal, then the computer system can interactively go through each missing DT sending instructions to each until the identifying information is received during the conflicting time slot or until there are no DTs with missing transmission remaining. If the computer system is unable to infer which is the missing DT either based on a DTs with missing transmissions or otherwise, then the computer system can send instructions to all of the DTs in the domain indicating that during the next period of signal transmissions, each DT is to transmit its identifying information. Although the first two approaches could generally be sent via a downstream RF link directed at a specific DT, in this approach, the computer system would employ an on-grid transmission and/or a downstream RF link to all of the DTs to increase the likelihood that the conflicting DT will receive the transmission. Once the ID of the conflicting DT has been received during the conflicting time slot, then the computer system, and generally it is the FIM which determines a DT's ID from a transmission signal, updates its database to reflect that the conflicting DT associated with the conflicting DT's ID is transmitting at the conflicting time slot.

FIG. 14 is a flowchart depicting a logical flow of a methodology for resolving the conflict in transmissions between two DTs. As described above, when the computer system determines the identification of the conflicting DT, then the computer system updates its database to reflect the conflicting slot allotment time to be that of the conflicting DT. The computer system implements the following in a preferred approach to update the computer system's database information:

In segment S1300, the conflicting DT resolution process begins. Process flow continues to segment S1302.

In segment S1302, the Conflicting DT is detected, e.g., most likely during the next time corresponding to the assigned slot, which is typically 24 hours later, when it again transmits. Process flow continues to segment S1304.

In segment S1304, the computer system determines the ID of the Conflicting DT and provides it to the computer system, e.g., the network and data management component of the computer system, for lookup. In one respect the ID of the conflicting DT is determined by identification of the DT. In another aspect, the conflicting DT is determined based on a combination of the feeder and phase that the computer system, most likely the FIM, has associated with the signal received from the conflicting DT and some portion of information in the header or payload data of the signal. The computer system also tracks the location of the conflicting DT. Process flow continues to segment S1306.

In segment S1306, the computer system's database, e.g., VG, is updated to reflect the conflicting DT to transmit at the conflicting slot allotment time and the location of the conflicting DT. Process flow continues to segment S1308.

In segment S1308, the Routine exits and process ends.

Thus, at the end of this process, the conflicting DT has been identified and the computer system's database has been updated to reflect the conflicting DT's slot allotment and its location.

During the course of a distribution grid operation, the occasion may arise when a DT should have a new slot allotment. The occasion could be, for example, due to a conflict, as described above, or the occasion could be for some other reason. Once the computer system has determined that a DT should be reassigned to a different time slot(s), it will reserve a new slot(s) for the DT and send that new slot(s) information to the DT. After the computer system receives acknowledgement of receipt back from the DT, the computer system updates its database to reflect the slot assignments for the DT.

In another approach, the computer system determines the conflicting DT by looking at signals received from DTs on the grids. The computer system tracks when the last signal has been received from each DT. Therefore, the computer system can determine which, if any, DTs that are scheduled to transmit, e.g., they have at least one slot assignment, but the computer system has not received any signals from them for at least some time, e.g. one period. If there is only one DT from which there has been no signal received for some time, then the computer system assumes that this the DT in conflict. If there several DTs from which there has been no signal received for some time, then the computer system can iteratively process each of these DTs assuming that it is the DT in conflict, and reassign slot assignments for each. In a variation of this approach, the computer system will work reassigning DTs iteratively through only some of the DTs without a recent signal until some stopping point is reached (and the computer system can resume reassigning DTs that have not been recently heard from). For example, the computer system will stop after a fixed number of DTs are reassigned. In another approach, the computer system will stop reassigning DTs when the time slot that had candidate signal energy received but no identifiable signal has changed, and now the time slot either has an identifiable signal or the time slot does not have candidate signal energy sufficient to suggest that a DT device transmitted during that time.

FIG. 15 is a flowchart depicting a logical flow of a methodology for resolving the conflicting DT in accordance with a preferred approach of the invention. As described above, when the computer system determines the identification of the conflicting DT, then the computer system updates its database to reflect the conflicting slot allotment time to be that of the conflicting DT. The computer system implements the following in a preferred approach:

In segment S1402, the Intentional Reassignment process begins. Process flow continues to segment S1404.

In segment S1404, the network and data management component reserves a slot(s) for the DT. The component preferably uses one of the methods described above to assign slot(s) for the DT, or any other appropriate method. Process flow continues to segment S1406.

In segment S1406, a counter, Loop_Count, is set to zero. Process flow continues to segment S1408.

In segment S1408, the counter is incremented by one, e.g., Loop_Count=Loop_Count+1. Process flow continues to segment S1410.

In segment S1410, the counter is compared to Max_Retries, the max number of retries for waiting for acknowledgement from the DT, e.g., Loop_Count>Max_Retries?. If the counter is less than Max_Retries, then process flow continues to segment S1412. Otherwise, process flow continues to segment S1420.

In segment S1412, the computer system causes the slot assignment(s), e.g., Slot_Assigned, to be sent to the DT, preferably by way of an RF link. Process flow continues to segment S1414.

In segment S1414, the system waits for a system clock or other timing mechanism to reach a predefined time of Round_Trip seconds. Process flow continues to segment S1416.

In segment S1416, the system checks whether it has received an acknowledgment of slot assignments being received from the DT. If an acknowledgement has been received, the process flow continues to segment S1418. Otherwise, process flow continues to segment S1408.

In segment S1418, the network and data management component confirms that the reserved slot(s), e.g., Slot_Assigned, for the DT are assigned to the DT. Process flow continues to segment S1422.

In segment S1422, the process exits and ends.

In segment S1420, the computer system releases all of the reserved slots for the DT in the database. Process flow continues to segment S1422.

Thus, at the preferable end of the process, the DT has been assigned a new time slot(s). The slot assignment(s) for the DT is stored in the DT and in the computer system.

Use of the present invention provides at least several advantages: First, the algorithm(s) are relatively simple, which would suggest that the algorithms are relatively simple to employ, modify, if needed, and maintain. Secondly, the invention can be employed to introduce or modify DT operation without or with a priori knowledge of the circuit topology. Thirdly, the invention can be employed to introduce or modify a DT. Fourth, the invention can be employed to resolve circuit fold-overs without increase of time or complexity, essentially without regard to the size of the fold-over. Fifth, employment of the invention supports recovery of information in a timely manner. Sixth, employment of the invention is compatible with, but does not require, a priori knowledge of movement of DTs. Seventh, employment of the invention can be used without a priori assignment of initial slot assignments. Eighth, employment of the invention is False Positive Tolerant. Ninth, employment of the invention does not add traffic to async payload slots.

One of skill in the art will appreciate that the foregoing disclosure includes important novel inventions. In certain aspects, and in no way negativing the novelty of the present invention, one of skill in the art will appreciate that portions of these inventions represent the novel combination of some known features. It will also be well appreciated that such known features (such as, for example, methods of seeding a random number generator and methods of sending sequential instructions or a message containing all instructions), can be performed in any of a variety of well-known ways. Consequently, any particular presentation as to a method or feature provided above, should be understood to be merely exemplary. The practitioner of ordinarily of skill in the art, having had the benefit of the present disclosure, will readily see how to apply other methods, whether already known or yet to be developed, in the practice of the present invention. The inventors therefore make the following disclosure with the understanding that any such routine applications of known methods are intended to fall within the scope of the present disclosure, without in any way reducing the inventiveness of the material disclosed.

While the invention has been described and illustrated with reference to specific exemplary embodiments, it should be understood that many modifications, combinations, and substitutions can be made without departing from the spirit and scope of the invention. For example, although process flows are described with a certain process flow and segments, the invention is not so limited and various flows could achieve the same desired result. Similarly some segments can be modified, omitted and new segments included and achieve the same desired result. Accordingly, the invention is not to be considered as limited by the foregoing description but is only limited by the scope of the claims.

What is claimed as new and desired to be protected by Letters Patent of the United States is:

1. A method for resolving a slot conflict, comprising:
   determining, by a computing device comprising a processor device, that signals received by a receiver via an electrical distribution grid during a message time slot comprise multiple transmissions that were transmitted by corresponding multiple downstream transmitters of a plurality of downstream transmitters, the message time slot being assigned to only one downstream transmitter of the multiple downstream transmitters;

identifying a first downstream transmitter of the multiple downstream transmitters;

assigning a new message time slot to the first downstream transmitter; and causing a new time slot identifier that identifies the new message time slot to be sent to the first downstream transmitter.

2. The method of claim 1 wherein causing the new time slot identifier that identifies the new message time slot to be sent to the first downstream transmitter further comprises causing the new time slot identifier that identifies the new message time slot to be wirelessly sent to the first downstream transmitter.

3. The method of claim 1 wherein the receiver is coupled to the electrical distribution grid on a high voltage side of one or more service transformers between the receiver and the multiple downstream transmitters.

4. The method of claim 1 wherein identifying the first downstream transmitter comprises:

accessing a slot assignment database that identifies the plurality of downstream transmitters and a corresponding plurality of message time slots assigned to the plurality of downstream transmitters; and based on the slot assignment database, determining that the message time slot is assigned to the first downstream transmitter.

5. The method of claim 1 further comprising:

determining that signals received by the receiver during a subsequent occurrence of the message time slot originate from a second downstream transmitter of the multiple downstream transmitters; and updating a slot assignment database to assign the message time slot to the second downstream transmitter.

6. The method of claim 1 wherein assigning the new message time slot to the first downstream transmitter comprises randomly selecting the new message time slot from a plurality of available message time slots.

7. The method of claim 1 wherein assigning the new message time slot to the first downstream transmitter comprises assigning a new message time slot that occurs at a time greater than a predetermined amount of time from a time at which the new message time slot is selected.

8. The method of claim 1 wherein assigning the new message time slot to the first downstream transmitter comprises assigning a plurality of new message time slots to the first downstream transmitter, and wherein causing the new time slot identifier that identifies the new message time slot to be sent to the first downstream transmitter comprises causing a plurality of new time slot identifiers that identify corresponding new message time slots of the plurality of new message time slots to be sent to the downstream transmitter.

9. The method of claim 8 wherein assigning the plurality of new message time slots to the first downstream transmitter comprises randomly assigning the plurality of new message time slots to the first downstream transmitter.

10. The method of claim 1 wherein identifying the first downstream transmitter of the multiple downstream transmitters comprises:

maintaining data that identifies a time of receipt of a last transmission from each downstream transmitter of the plurality of downstream transmitters;

determining that no transmission was received for each of the multiple downstream transmitters; and selecting a downstream transmitter of the multiple downstream transmitters as the first downstream transmitter.

11. A system comprising:

a computing device comprising:

a communication interface configured to communicate with a receiver coupled to an electrical distribution grid; and a processor device coupled to the communication interface and configured to:

determine that signals received by the receiver via the electrical distribution grid during a message time slot comprise multiple transmissions that were transmitted by corresponding multiple downstream transmitters of a plurality of downstream transmitters, the message time slot being assigned to only one downstream transmitter of the multiple downstream transmitters;

identify a first downstream transmitter of the multiple downstream transmitters;

assign a new message time slot to the first downstream transmitter; and cause a new time slot identifier that identifies the new message time slot to be sent to the first downstream transmitter.

12. The system of claim 11 wherein to cause the new time slot identifier that identifies the new message time slot to be sent to the first downstream transmitter, the processor device is further configured to cause the new time slot identifier that identifies the new message time slot to be wirelessly sent to the first downstream transmitter.

13. The system of claim 11 further comprising the receiver, and wherein the receiver is coupled to the electrical distribution grid on a high voltage side of one or more service transformers between the receiver and the multiple downstream transmitters.

14. The system of claim 11 wherein to identify the first downstream transmitter the processor device is further configured to:

access a slot assignment database that identifies the plurality of downstream transmitters and a corresponding plurality of message time slots assigned to the plurality of downstream transmitters; and based on the slot assignment database, determine that the message time slot is assigned to the first downstream transmitter.

15. The system of claim 11 wherein the processor device is further configured to:

determine that signals received by the receiver during a subsequent occurrence of the message time slot originate from a second downstream transmitter of the multiple downstream transmitters; and update a slot assignment database to assign the message time slot to the second downstream transmitter.

16. The system of claim 11 wherein to assign the new message time slot to the first downstream transmitter the processor device is further configured to randomly select the new message time slot from a plurality of available message time slots.

17. The system of claim 11 wherein to assign the new message time slot to the first downstream transmitter the processor device is further configured to assign a new message time slot that occurs at a time greater than a predetermined amount of time from a time at which the new message time slot is selected.

18. The system of claim 11 wherein to assign the new message time slot to the first downstream transmitter the processor device is further configured to assign a plurality of new message time slots to the first downstream transmitter, and wherein to cause the new time slot identifier that identifies the new message time slot to be sent to the first downstream transmitter the processor device is further configured to cause a plurality of new time slot identifiers that identify corresponding new message time slots of the plurality of new message time slots to be sent to the downstream transmitter.

19. The system of claim 18 wherein to assign the plurality of new message time slots to the first downstream transmitter the processor device is further configured to randomly assign the plurality of new message time slots to the first downstream transmitter.

20. The system of claim 11 wherein to identify the first downstream transmitter of the multiple downstream transmitters the processor device is further configured to:
- maintain data that identifies a time of receipt of a last transmission from each downstream transmitter of the plurality of downstream transmitters;
- determine that no transmission was received for each of the multiple downstream transmitters; and
- select a downstream transmitter of the multiple downstream transmitters as the first downstream transmitter.

* * * * *